US011128502B2

(12) United States Patent
Zhang et al.

(10) Patent No.: US 11,128,502 B2
(45) Date of Patent: Sep. 21, 2021

(54) REFERENCE SIGNAL TRANSMISSION METHOD, DEVICE, AND SYSTEM

(71) Applicant: Huawei Technologies Co., Ltd., Guangdong (CN)

(72) Inventors: Yi Zhang, Shanghai (CN); Chi Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/154,557

(22) Filed: Oct. 8, 2018

(65) Prior Publication Data
US 2019/0044775 A1   Feb. 7, 2019

Related U.S. Application Data

(63) Continuation of application No. PCT/CN2017/072916, filed on Feb. 4, 2017.

(30) Foreign Application Priority Data

Apr. 8, 2016  (CN) .......................... 201610218110.4
Sep. 29, 2016  (CN) .......................... 201610867115.X

(51) Int. Cl.
    *H04W 72/04*  (2009.01)
    *H04L 27/26*  (2006.01)
    *H04L 5/00*   (2006.01)

(52) U.S. Cl.
    CPC .......... *H04L 27/2607* (2013.01); *H04L 5/005* (2013.01); *H04L 5/0048* (2013.01);
    (Continued)

(58) Field of Classification Search
    CPC ............. H04L 27/2607; H04L 27/2613; H04L 5/0051; H04L 5/005; H04L 5/0048; H04W 72/0453
    See application file for complete search history.

(56) References Cited

U.S. PATENT DOCUMENTS

2011/0075760 A1* 3/2011 Ogawa ................ H04J 13/0055
                                                      375/296
2011/0105167 A1* 5/2011 Pan ....................... H04B 7/0671
                                                      455/507
(Continued)

FOREIGN PATENT DOCUMENTS

CN          101384055 A       3/2009
CN          103220791 A       7/2013
(Continued)

OTHER PUBLICATIONS

Pantech, "Considerations on Uplink DM-RS sequence in LTE-Advanced", 3GPP TSG RAN WG1 Meeting #59-bis, R1-100668, Jan. 2010, 6 pages.

(Continued)

*Primary Examiner* — Hassan Kizou
*Assistant Examiner* — Mahbubul Bar Chowdhury
(74) *Attorney, Agent, or Firm* — Womble Bond Dickinson (US) LLP

(57) ABSTRACT

Embodiments of the present application provide a reference signal transmission method, a device, and a system. The method includes: determining, by a first device, at least one reference signal generation sequence corresponding to at least one frequency-domain resource group that is on a symbol carrying a reference signal and that is used to send the reference signal, where one frequency-domain resource group is corresponding to one reference signal generation sequence; and generating, by the first device, the reference signal based on the at least one reference signal generation sequence, and mapping the reference signal to a time-frequency resource whose time domain is the symbol and whose frequency domain is the at least one frequency-domain resource group.

24 Claims, 6 Drawing Sheets

First user equipment determines at least one base sequence corresponding to at least one frequency-domain resource group that is on a symbol carrying a reference signal and that is used to send the reference signal, where one frequency-domain resource group is corresponding to one type of base sequence, and each frequency-domain resource group includes a plurality of subcarriers that have a same quantity  — 101

The first user equipment generates the reference signal based on the at least one base sequence, and maps the reference signal to a time-frequency resource whose time domain is the symbol and whose frequency domain is the at least one frequency-domain resource group  — 102

(52) U.S. Cl.
CPC ........ *H04L 5/0051* (2013.01); *H04L 27/2613*
(2013.01); *H04W 72/0453* (2013.01)

(56) References Cited

U.S. PATENT DOCUMENTS

| | | | |
|---|---|---|---|
| 2011/0183609 A1* | 7/2011 | Noh | H04L 5/0053 455/39 |
| 2012/0140717 A1* | 6/2012 | Zhu | H04L 5/001 370/329 |
| 2013/0034070 A1* | 2/2013 | Seo | H04B 7/155 370/329 |
| 2013/0155992 A1 | 6/2013 | Yoon et al. | |
| 2013/0189930 A1* | 7/2013 | Kinnunen | H04L 5/0051 455/67.11 |
| 2014/0192756 A1* | 7/2014 | Baldemair | H04L 5/001 370/329 |
| 2015/0078289 A1 | 3/2015 | Kakishima et al. | |
| 2016/0249348 A1 | 8/2016 | Kang et al. | |
| 2016/0323129 A1 | 11/2016 | Wang | |
| 2018/0316469 A1* | 11/2018 | Jiang | H04L 5/0051 |
| 2019/0089504 A1* | 3/2019 | Hwang | H04L 5/0051 |
| 2019/0124675 A1* | 4/2019 | Gao | H04W 72/04 |
| 2019/0349167 A1* | 11/2019 | Gao | H04L 5/0064 |

FOREIGN PATENT DOCUMENTS

| | | |
|---|---|---|
| CN | 104579545 A | 4/2015 |
| JP | 2013-236328 A | 11/2013 |
| JP | 2014-525203 A | 9/2014 |
| WO | 2015/103788 A1 | 7/2015 |

OTHER PUBLICATIONS

Pantech, "Considerations on Uplink DM-RS design for LTE-Advanced", 3GPP TSG RAN WG1 Meeting #60-bis, R1-102407, Apr. 2010, 6 pages.

Ericsson, "Physical layer aspects of short TTI for uplink transmissions", 3GPP TSG RAN WG1 Meeting #83, Anaheim, USA, Nov. 15-22, 2015, 4 pages, R1-157149.

* cited by examiner

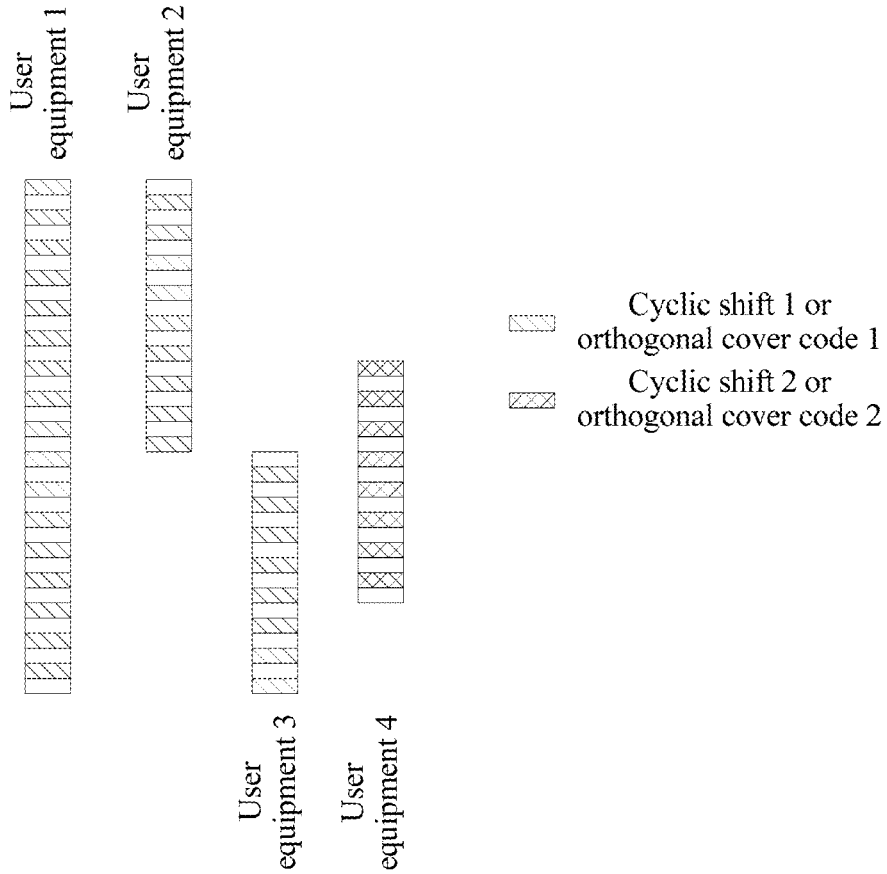

FIG. 6

| A base station sends downlink control signaling to user equipment, where the downlink control signaling is used to indicate a frequency-domain resource group that is on a symbol carrying a reference signal and that is used by the user equipment to send the reference signal, and each frequency-domain resource group includes a plurality of subcarriers that have a same quantity | 701 |

↓

| The base station receives, on the frequency-domain resource group, the reference signal sent by the user equipment | 702 |

FIG. 7

|   | 0 | 1 | 2 | 3 | 4 | 5 | 6 |
|---|---|---|---|---|---|---|---|
| N |   |   | Device 1 |   | Device 2 | Device 2 |   |
| N+1 |   |   | Device 1 |   | Device 2 | Device 2 |   |
| N+2 |   |   | Device 1 |   | Device 3 | Device 3 |   |
| N+3 |   |   | Device 1 |   | Device 3 | Device 3 |   |

FIG. 10

REFERENCE SIGNAL TRANSMISSION METHOD, DEVICE, AND SYSTEM

CROSS-REFERENCE TO RELATED APPLICATIONS

This application is a continuation of International Application No. PCT/CN2017/072916 filed on Feb. 4, 2017, which claims priority to Chinese Patent Application No. 201610218110.4 filed on Apr. 8, 2016 and Chinese Patent Application No. 201610867115.X filed on Sep. 29, 2016, all of which are hereby incorporated by reference in their entireties.

TECHNICAL FIELD

Embodiments of the present application relate to the communications field, and more specifically, to a reference signal transmission method, a device, and a system.

BACKGROUND

A 5th generation (5G) network is also referred to as NR (New Radio/RAT). The International Telecommunications Union (ITU) defines three types of services in expectations and requirements of 5G: an enhanced mobile broadband (eMBB) service, an ultra-reliable and low latency communications (URLLC) service, and a massive machine type communication (mMTC) service. An expected latency in the URLLC service is extremely short, and a minimum latency is merely 1 ms. Because the URLLC service has an urgent latency, when data arrives, resources need to be immediately scheduled and allocated without waiting. In addition, the URLLC service has a high reliability requirement, usually requiring ultra-high reliability of 99.999%.

In the prior art related to embodiments of the present application, in an uplink multi-user multiple-input multiple-output (UL MU-MIMO) system in Long Term Evolution (LTE), defining, in a code division multiplexing (CDM) manner, mutually orthogonal demodulation reference signals (DMRS) on a same time-frequency resource is allowed, so as to implement reference signal (RS) resource multiplexing among paired user equipments (UE) in UL MU-MIMO. If the paired UEs in UL MU-MIMO occupy different bandwidths and the bandwidths partly overlap, different UEs use reference signal base sequences of different lengths. In this case, orthogonality among RSs of different UEs cannot be ensured by using only cyclic shifts of the base sequences. A similar problem also exists in a scenario in which paired UEs in a downlink multi-user multiple-input multiple-output (DL MU-MIMO) system occupy different bandwidths, and the bandwidths partly overlap, and in a scenario of an orthogonal/quasi-orthogonal pilot design among different cells. How to ensure orthogonality among RSs of different UEs in different bandwidth scenarios to implement RS resource multiplexing of a plurality of UEs is a technical problem to be resolved in the embodiments of the present application.

SUMMARY

Embodiments of the present application provide a reference signal transmission method, a device, and a system, to implement RS resource multiplexing of a plurality of UEs.

According to a first aspect, a reference signal transmission method is provided, where the method includes: determining, by first user equipment, at least one base sequence corresponding to at least one frequency-domain resource group that is on a symbol carrying a reference signal and that is used to send the reference signal, where one frequency-domain resource group is corresponding to one base sequence, and each frequency-domain resource group includes a plurality of subcarriers that have a same quantity; and generating, by the first user equipment, the reference signal based on the at least one base sequence, and mapping the reference signal to a time-frequency resource whose time domain is the symbol and whose frequency domain is the at least one frequency-domain resource group.

With reference to the first aspect, in a first possible implementation, if both the first user equipment and second user equipment generate reference signal sequences on a third frequency-domain resource group, cyclic shifts used by the first user equipment and the second user equipment to generate the reference signal sequences based on a third base sequence are different, where the third frequency-domain resource group is one of the at least one frequency-domain resource group, and the third base sequence is a base sequence corresponding to the third frequency-domain resource group.

With reference to the first aspect or the first possible implementation of the first aspect, in a second possible implementation, specific implementation of determining, by first user equipment, at least one base sequence corresponding to at least one frequency-domain resource group that is on a symbol carrying a reference signal and that is used to send the reference signal is: determining, by the first user equipment, a first base sequence corresponding to a first frequency-domain resource group, and determining a second base sequence corresponding to a second frequency-domain resource group; and specific implementation of generating, by the first user equipment, the reference signal based on the at least one base sequence, and mapping the reference signal to a time-frequency resource whose time domain is the symbol carrying the reference signal and whose frequency domain is the at least one frequency-domain resource group is: generating, by the first user equipment, a first reference signal sequence of the reference signal based on the first base sequence, and mapping the first reference signal sequence to a time-frequency resource whose time domain is the symbol and whose frequency domain is the first frequency-domain resource group; and generating, by the first user equipment, a second reference signal sequence of the reference signal based on the second base sequence, and mapping the second reference signal sequence to a time-frequency resource whose time domain is the symbol and whose frequency domain is the second frequency-domain resource group.

With reference to the second possible implementation of the first aspect, in a third possible implementation, a cyclic shift used by the first user equipment to generate the first reference signal sequence is the same as a cyclic shift used to generate the second reference signal sequence.

With reference to the third possible implementation of the first aspect, in a fourth possible implementation, the cyclic shift is notified by a base station to the first user equipment; or the cyclic shift is determined by the first user equipment based on a configuration parameter, where the configuration parameter includes one or more of a user equipment-specific configuration parameter, a time domain-specific configuration parameter, a cell-specific configuration parameter, or a frequency domain-specific configuration parameter that are of the first user equipment, and the configuration parameter cannot include only the cell-specific configuration parameter or the frequency domain-specific configuration parameter.

With reference to the foregoing possible implementations of the first aspect, in a fifth possible implementation, a correspondence between the frequency-domain resource group and the base sequence is pre-defined, or a correspondence between the frequency-domain resource group and the base sequence is sent by the base station to the first user equipment.

According to a second aspect, user equipment is provided, configured to perform the method in any one of the first aspect or the possible implementations of the first aspect.

Specifically, the user equipment may include units configured to perform the method in any one of the first aspect or the possible implementations of the first aspect.

According to a third aspect, another user equipment is provided, including a memory and a processor, where the memory is configured to store an instruction, and the processor is configured to execute the instruction stored in the memory, and executes the instruction stored in the memory, so that the processor performs the method in any one of the first aspect or the possible implementations of the first aspect.

According to a fourth aspect, a computer readable storage medium is provided, configured to store a computer program, and the computer program includes an instruction used to perform the method in any one of the first aspect or the possible implementations of the first aspect.

According to a fifth aspect, another reference signal transmission method is provided, where the method includes: receiving, by user equipment, downlink control signaling sent by a base station, where the downlink control signaling is used to indicate a frequency-domain resource group that is on a symbol carrying a reference signal and that is used by the user equipment to send the reference signal; and generating, by the user equipment, a reference signal sequence, and mapping the reference signal sequence to a time-frequency resource whose time domain is the symbol and whose frequency domain is the frequency-domain resource group.

With reference to the fifth aspect, in a first possible implementation of the fifth aspect, the method further includes: determining, by the user equipment, the frequency-domain resource group based on a frequency-domain resource occupied by the user equipment and a frequency-domain comb, where the frequency-domain resource group includes a plurality of evenly spaced comb teeth (one comb tooth is one subcarrier).

With reference to the fifth aspect or the first possible implementation of the fifth aspect, in a second possible implementation of the fifth aspect, the frequency-domain comb is used to obtain one subcarrier at an interval of N subcarriers from a continuous frequency-domain resource, to obtain a plurality of evenly spaced comb teeth (subcarriers).

With reference to the fifth aspect, and the first and the second possible implementations of the fifth aspect, in a third possible implementation of the fifth aspect, a comb structure may include M consecutive subcarriers obtained at an interval of N subcarriers, where intervals between a plurality of M subcarriers are equal.

According to a sixth aspect, user equipment is provided, configured to perform the method in any one of the fifth aspect or the possible implementations of the fifth aspect.

Specifically, the user equipment may include units configured to perform the method in any one of the fifth aspect or the possible implementations of the fifth aspect.

According to a seventh aspect, another user equipment is provided, including a memory and a processor, where the memory is configured to store an instruction, and the processor is configured to execute the instruction stored in the memory, and executes the instruction stored in the memory, so that the processor performs the method in any one of the fifth aspect or the possible implementations of the fifth aspect.

According to an eighth aspect, a computer readable storage medium is provided, configured to store a computer program, and the computer program includes an instruction used to perform the method in any one of the fifth aspect or the possible implementations of the fifth aspect.

According to a ninth aspect, another reference signal communication method is provided, where the method includes: determining, by user equipment, a frequency-domain resource that carries a reference signal of the user equipment, where the frequency-domain resource is subcarriers that are distributed at equal intervals in frequency domain, and the reference signal is used for data channel demodulation; and sending, by the user equipment, the reference signal to a base station on the frequency-domain resource, or receiving, by the user equipment on the frequency-domain resource, the reference signal sent by a base station.

With reference to the ninth aspect, in a first possible implementation of the ninth aspect, the determining, by user equipment, a frequency-domain resource that carries a reference signal of the user equipment includes: determining, by the user equipment based on a first parameter, the frequency-domain resource that carries the reference signal of the user equipment, where the first parameter includes at least one of the following parameters: a user equipment-specific parameter, a time domain-specific parameter, a cell-specific parameter, a frequency domain-specific parameter, or a first configuration parameter from the base station, where the first configuration parameter from the base station is configuration information sent by the base station to the user equipment, and the configuration information is used by the user equipment to determine the frequency-domain resource that carries the reference signal of the user equipment.

With reference to the first possible implementation of the ninth aspect, in a second possible implementation of the ninth aspect, the first configuration parameter from the base station includes at least one of the following parameters: an antenna port, a frequency domain start location of a transmission comb, a transmission comb index, or a subcarrier set index.

With reference to any one of the ninth aspect or the first and the second possible implementations of the ninth aspect, in a third possible implementation of the ninth aspect, the user equipment determines, based on a second parameter, a cyclic shift and/or an orthogonal cover code used for a sequence of the reference signal, where the second parameter includes at least one of the following parameters: the user equipment-specific parameter, the time domain-specific parameter, the cell-specific parameter, the frequency domain-specific parameter, or a second configuration parameter from the base station, where the second configuration parameter from the base station is configuration information sent by the base station to the user equipment, and the configuration information is used by the user equipment to determine the cyclic shift and/or the orthogonal cover code used for the sequence of the reference signal.

With reference to the third possible implementation of the ninth aspect, in a fourth possible implementation of the ninth aspect, the second configuration parameter from the base station includes at least one of the following parameters: the antenna port, the frequency domain start location of the transmission comb, the transmission comb index, the subcarrier set index, a cyclic shift identifier, or an orthogonal cover code identifier.

According to a tenth aspect, user equipment is provided, configured to perform the method in any one of the ninth aspect or the possible implementations of the ninth aspect.

According to an eleventh aspect, another user equipment is provided, including a memory and a processor, where the memory is configured to store an instruction, and the processor is configured to execute the instruction stored in the memory, and executes the instruction stored in the memory, so that the processor performs the method in any one of the ninth aspect or the possible implementations of the ninth aspect.

According to a twelfth aspect, a computer readable storage medium is provided, configured to store a computer program, where the computer program includes an instruction used to perform the method in any one of the ninth aspect or the possible implementations of the ninth aspect.

According to a thirteenth aspect, another reference signal transmission method is provided, where the method includes: sending, by a base station, downlink control signaling to user equipment, where the downlink control signaling is used to indicate a frequency-domain resource group that is on a symbol carrying a reference signal and that is used by the user equipment to send the reference signal; and receiving, by the base station, the reference signal sent by the user equipment on the frequency-domain resource group.

With reference to the thirteenth aspect, in a first possible implementation of the thirteenth aspect, the downlink control signaling carries a frequency-domain comb index, and the frequency-domain comb index is used to determine the frequency-domain resource group in combination with a frequency-domain resource of the user equipment, where the frequency-domain resource group includes a plurality of evenly spaced comb teeth (one comb tooth is one subcarrier).

With reference to the thirteenth aspect and the first possible implementation of the thirteenth aspect, in a second possible implementation of the thirteenth aspect, the frequency-domain comb is corresponding to one type of base sequence, and the frequency-domain comb index is further used by the user equipment to determine a base sequence used to generate a reference signal sequence, and there may be a multiple-to-one or one-to-one correspondence between the frequency-domain comb and the base sequence.

With reference to the thirteenth aspect, and the first and the second possible implementations of the thirteenth aspect, in a third possible implementation of the thirteenth aspect, the base station sends the downlink control signaling by using a UE-specific message or the like.

According to a fourteenth aspect, a base station is provided, configured to perform the method in any one of the thirteenth aspect or the possible implementations of the thirteenth aspect.

Specifically, the base station may include units configured to perform the method in any one of the thirteenth aspect or the possible implementations of the thirteenth aspect.

According to a fifteenth aspect, another base station is provided, including a memory and a processor, where the memory is configured to store an instruction, and the processor is configured to execute the instruction stored in the memory, and executes the instruction stored in the memory, so that the processor performs the method in any one of the thirteenth aspect or the possible implementations of the thirteenth aspect.

According to a sixteenth aspect, a computer readable storage medium is provided, configured to store a computer program, where the computer program includes an instruction used to perform the method in any one of the thirteenth aspect or the possible implementations of the thirteenth aspect.

According to a seventeenth aspect, another reference signal communication method is provided, where the method includes: sending, by a base station, downlink control signaling to user equipment, where the downlink control signaling is used to instruct the user equipment to determine a frequency-domain resource that carries a reference signal of the user equipment, the frequency-domain resource is subcarriers that are distributed at equal intervals in frequency domain, and the reference signal is used for data channel demodulation; sending, by the base station, the reference signal to the user equipment on the frequency-domain resource, or receiving, by the base station on the frequency-domain resource, the reference signal sent by the user equipment.

With reference to the seventeenth aspect, in a first possible implementation of the seventeenth aspect, the downlink control signaling carries a first parameter, where the first parameter is used to determine the frequency-domain resource that carries the reference signal of the user equipment, and the first parameter includes at least one of the following parameters: a user equipment-specific parameter, a time domain-specific parameter, a cell-specific parameter, a frequency domain-specific parameter, or a first configuration parameter from the base station, where the first configuration parameter from the base station is configuration information sent by the base station to the user equipment, and the configuration information is used by the user equipment to determine the frequency-domain resource that carries the reference signal of the user equipment.

With reference to the seventeenth aspect and the first possible implementation of the seventeenth aspect, in a second possible implementation of the seventeenth aspect, the first configuration parameter from the base station includes at least one of the following parameters: an antenna port, a frequency domain start location of a transmission comb, a transmission comb index, or a subcarrier set index.

With reference to the seventeenth aspect, and the first and the second possible implementations of the seventeenth aspect, in a third possible implementation of the seventeenth aspect, the downlink control signaling carries a second parameter, where the second parameter is used to determine a cyclic shift and/or an orthogonal cover code used for a sequence of the reference signal, and the second parameter includes at least one of the following parameters: the user equipment-specific parameter, the time domain-specific parameter, the cell-specific parameter, the frequency domain-specific parameter, or a second configuration parameter from the base station, where the second configuration parameter from the base station is configuration information sent by the base station to the user equipment, and the configuration information is used by the user equipment to determine the cyclic shift and/or the orthogonal cover code used for the sequence of the reference signal.

With reference to the seventeenth aspect and the first to the third possible implementations of the seventeenth aspect, in a fourth possible implementation of the seventeenth aspect, the second configuration parameter from the base station includes at least one of the following parameters: the antenna port, the frequency domain start location of the transmission comb, the transmission comb index, the sub-carrier set index, a cyclic shift identifier, or an orthogonal cover code identifier.

According to an eighteenth aspect, a base station is provided, configured to perform the method in any one of the seventeenth aspect or the possible implementations of the seventeenth aspect.

Specifically, the base station may include units configured to perform the method in any one of the seventeenth aspect or the possible implementations of the seventeenth aspect.

According to a nineteenth aspect, another base station is provided, including a memory and a processor, where the memory is configured to store an instruction, and the processor is configured to execute the instruction stored in the memory, and executes the instruction stored in the memory, so that the processor performs the method in any one of the seventeenth aspect or the possible implementations of the seventeenth aspect.

According to a twentieth aspect, a computer readable storage medium is provided, configured to store a computer program, where the computer program includes an instruction used to perform the method in any one of the seventeenth aspect or the possible implementations of the seventeenth aspect.

According to a twenty-first aspect, a reference signal transmission method is provided, where the method includes: determining, by a first device, at least one reference signal generation sequence corresponding to at least one frequency-domain resource group that is on a symbol carrying a reference signal and that is used to send the reference signal, where one frequency-domain resource group is corresponding to one reference signal generation sequence; and generating, by the first device, the reference signal based on the at least one reference signal generation sequence, and mapping the reference signal to a time-frequency resource whose time domain is the symbol and whose frequency domain is the at least one frequency-domain resource group.

With reference to the twenty-first aspect, in a first possible implementation, when both the first device and a second device map reference signals to a time-frequency resource whose time domain is the symbol and whose frequency domain is a third frequency-domain resource group, cyclic shifts or orthogonal cover codes used by the first device and the second device to generate the reference signals based on a third reference signal generation sequence are different, where the third frequency-domain resource group is one of the at least one frequency-domain resource group, and the third reference signal generation sequence is a reference signal generation sequence corresponding to the third frequency-domain resource group.

With reference to the first possible implementation of the twenty-first aspect, in a second possible implementation, the cyclic shift or the orthogonal cover code is determined by the first device based on a first parameter set, and parameters in the first parameter set include one or more of a user equipment-specific parameter, a time domain-specific parameter, a cell-specific parameter, a frequency domain-specific parameter, a network side device-specific parameter, a frequency domain-specific parameter, a network side configuration parameter, or a combination parameter, where the combination parameter is a combination of a plurality of parameters in the user equipment-specific parameter, the time domain-specific parameter, the cell-specific parameter, the network side device-specific parameter, the frequency domain-specific parameter, and the network side configuration parameter; or when the first device is user equipment, the cyclic shift or the orthogonal cover code is notified to the first device by a network side device connected to the first device.

With reference to the twenty-first aspect, in a third possible implementation, when both the first device and a second device map reference signals to a time-frequency resource whose time domain is the symbol and whose frequency domain is a third frequency-domain resource group, a reference signal generation sequence corresponding to the first device on the third frequency-domain resource group is different from a reference signal generation sequence corresponding to the second device on the third frequency-domain resource group.

With reference to the third possible implementation of the twenty-first aspect, in a fourth possible implementation, specific implementation of determining, by a first device, at least one reference signal generation sequence corresponding to at least one frequency-domain resource group that is on a symbol carrying a reference signal and that is used to send the reference signal is: determining, by the first device, a first reference signal generation sequence corresponding to a first frequency-domain resource group, and determining a second reference signal generation sequence corresponding to a second frequency-domain resource group; and specific implementation of generating, by the first device, the reference signal based on the at least one reference signal generation sequence, and mapping the reference signal to a time-frequency resource whose time domain is the symbol carrying the reference signal and whose frequency domain is the at least one frequency-domain resource group is: generating, by the first device, a first reference signal sequence of the reference signal based on the first reference signal generation sequence, and mapping the first reference signal sequence to a time-frequency resource whose time domain is the symbol and whose frequency domain is the first frequency-domain resource group; and generating, by the first device, a second reference signal sequence of the reference signal based on the second reference signal generation sequence, and mapping the second reference signal sequence to a time-frequency resource whose time domain is the symbol and whose frequency domain is the second frequency-domain resource group.

With reference to the foregoing possible implementations of the twenty-first aspect, in a fifth possible implementation, the reference signal generation sequence is determined by the first device based on a second parameter set, and parameters in the second parameter set include one or more of a user equipment-specific parameter, a time domain-specific parameter, a cell-specific parameter, a network side device-specific parameter, a frequency domain-specific parameter, a network side configuration parameter, or a combination parameter, where the combination parameter is a combination of a plurality of parameters in the user equipment-specific parameter, the time domain-specific parameter, the cell-specific parameter, the network side device-specific parameter, the frequency domain-specific parameter, and the network side configuration parameter; or a correspondence between the frequency-domain resource group and the reference signal generation sequence is predefined, or when the first device is user equipment, a correspondence between the frequency-domain resource group and the reference signal generation sequence is sent to the first device by a network side device connected to the first device.

According to a twenty-second aspect, a device is provided, configured to perform the method in any one of the twenty-first aspect or the possible implementations of the twenty-first aspect.

Specifically, the device may include units configured to perform the method in any one of the twenty-first aspect or the possible implementations of the twenty-first aspect.

According to a twenty-third aspect, another device is provided, including a memory and a processor, where the memory is configured to store an instruction, and the processor is configured to execute the instruction stored in the memory, and executes the instruction stored in the memory, so that the processor performs the method in any one of the twenty-first aspect or the possible implementations of the twenty-first aspect.

According to a twenty-fourth aspect, a computer readable storage medium is provided, configured to store a computer program, where the computer program includes an instruction used to perform the method in any one of the twenty-first aspect or the possible implementations of the twenty-first aspect.

According to a twenty-fifth aspect, a communications system is provided, where the communications system includes user equipment, and the user equipment includes the user equipment in any one of the first aspect or the possible implementations of the first aspect.

According to a twenty-sixth aspect, a communications system is provided, where the communications system includes a base station and user equipment, and the user equipment is the user equipment in any one of the second aspect or the possible implementations of the second aspect or the user equipment in any one of the third aspect or the possible implementations of the third aspect.

According to a twenty-seventh aspect, a communications system is provided, where the communications system includes user equipment, and the user equipment includes the user equipment in any one of the ninth aspect or the possible implementations of the ninth aspect.

According to a twenty-eighth aspect, a communications system is provided, where the communications system includes a device, and the device is the device in any one of the twenty-second aspect or the possible implementations of the twenty-second aspect or the device in any one of the twenty-third aspect or the possible implementations of the twenty-third aspect. Based on the foregoing technical solutions, on one hand, different base sequences are determined based on different frequency-domain resource groups, and reference signal sequences are generated based on the base sequences and are mapped to corresponding time-frequency resources, to help different UEs implement RS orthogonality in different bandwidths, thereby improving RS resource multiplexing efficiency, and implementing RS resource multiplexing of a plurality of UEs. On the other hand, different frequency-domain resource groups are allocated to different user equipments to send reference signals, so that RS resource multiplexing efficiency is improved, and RS resource multiplexing of a plurality of UEs is implemented.

BRIEF DESCRIPTION OF THE DRAWINGS

FIG. 6 is a schematic diagram of multiplexing an RS resource by a plurality of user equipments by using a method of combining FDM and CDM according to an embodiment of the present application;

FIG. 7 is a schematic diagram of another reference signal transmission method according to an embodiment of the present application;

FIG. 10 is another schematic diagram of RS resource multiplexing of a plurality of users in an uplink according to an embodiment of the present application.

DETAILED DESCRIPTION

Figure 1:
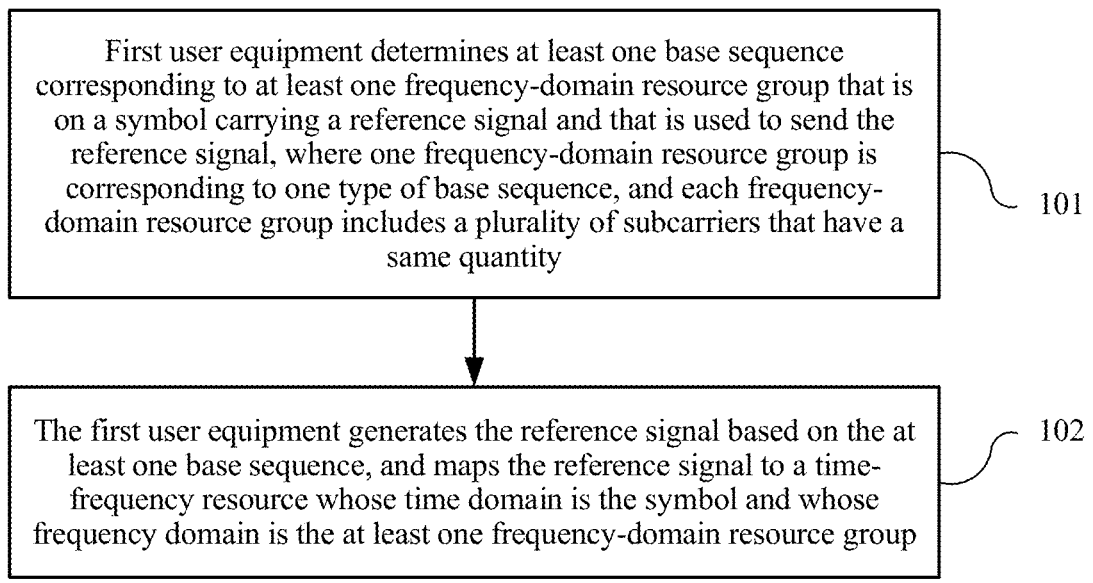
FIG. 1 is a schematic diagram of a reference signal transmission method according to an embodiment of the present application.

The following describes technical solutions in embodiments of the present application with reference to accompanying drawings.

It should be understood that, the technical solutions of the embodiments of the present application may be applied to various communications systems, such as: a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

A terminal may be referred to as user equipment (UE), a user, or the like. The terminal may communicate with one or more core networks by using a radio access network (RAN). The terminal may be a mobile terminal, such as a mobile phone (also referred to as a "cellular" phone) and a computer with a mobile terminal. For example, the terminal may be a portable, pocket-sized, handheld, computer built-in, or in-vehicle mobile apparatus, which exchanges voice and/or data with the radio access network.

For ease of understanding the embodiments of the present application, some elements that are introduced in descriptions of the embodiments of the present application are described herein first.

An air interface resource is defined as air interface time-domain and frequency-domain resources, and is usually represented by a resource element (RE), a resource block (RB), a symbol, a subcarrier, and a transmission time interval (TTI). The air interface resource may be divided from perspectives of frequency domain and time domain. A minimum resource granularity of frequency domain division is a subcarrier, and a minimum resource granularity of time domain division is a symbol.

One RE represents a resource of one subcarrier within one symbol time, and each RE may carry specific information. N symbols form one TTI in terms of time. M subcarriers in one TTI are combined into one RB.

To ensure requirements of low latency and high reliability of a URLLC service, a URLLC uplink service may flexibly occupy a physical resource of an MBB uplink service in a short TTI in a preemption or reservation manner. The short TTI herein is a shorter subframe in terms of time. Currently, one LTE subframe length is 1 ms, and a subframe of the short TTI has a length shorter than 1 ms, for example, may be 0.125 ms or another time length. In the short TTI, because a quantity of time-domain symbols is reduced, in an uplink, there are few symbols that can be used for transmission of an uplink data demodulation RS, and there may be only one symbol. Therefore, in a scenario with RSs of a plurality of users, time-frequency resources occupied by two user equipments may overlap. In addition, a scenario of an orthogonal/quasi-orthogonal pilot design between different cells and a scenario in which paired UEs in UL/DL MU-MIMO occupy different bandwidths (the bandwidths partly overlap) face a similar technical problem. How to implement RS resource multiplexing of a plurality of users is a technical problem to be resolved in the embodiments of the present application.

FIG. 1 is a schematic diagram of a reference signal transmission method according to an embodiment of the present application. The method in FIG. 1 is performed by user equipment.

101. First user equipment determines at least one base sequence corresponding to at least one frequency-domain resource group that is on a symbol carrying a reference signal and that is used to send the reference signal.

One frequency-domain resource group is corresponding to one type of base sequence, and each frequency-domain resource group includes a plurality of subcarriers that have a same quantity.

It should be understood that, in this embodiment of the present application, one frequency-domain resource group may include a plurality of frequency-domain subcarriers, and each frequency-domain resource group includes a same quantity of subcarriers.

It should be understood that, in this embodiment of the present application, the symbol used to carry the reference signal may include one or more symbols.

It should be understood that one base sequence is not equivalent to one type of base sequence. One base sequence indicates a base sequence quantity, and one type of base sequence indicates a base sequence type.

The first user equipment sends the reference signal on the at least one frequency-domain resource group, each frequency-domain resource group sends one reference signal sequence of the reference signal, and at least one reference signal sequence sent on the at least one frequency-domain resource group forms the reference signal. Each reference signal sequence is generated by using one base sequence, and the first user equipment needs to determine that a quantity of base sequences is the same as a quantity of frequency-domain resource groups. One frequency-domain resource group is corresponding to one type of base sequence, different frequency-domain resource groups may use a same base sequence or different base sequences, and a total quantity of types of the at least one base sequence is less than or equal to a quantity of the at least one base sequence. It should be understood that one frequency-domain resource group is corresponding to one type of base sequence, and a frequency-domain resource group type may be in a one-to-one correspondence with a base sequence type, or may be in a multiple-to-one correspondence with the base sequence type. For example, one frequency-domain resource group index is corresponding to an index of one type of base sequence, and the frequency-domain resource group index may be related to the base sequence index. In a specific example, frequency-domain resource group indexes 1, 2, and 3 are corresponding to a base sequence index 1, and a frequency-domain resource group index 4 is corresponding to a base sequence index 2. In other words, different frequency-domain resource groups may use a same base sequence or different base sequences. A total quantity of types of the at least one base sequence corresponding to the at least one frequency-domain resource group used to send the reference signal is less than or equal to a quantity of the at least one base sequence.

Optionally, a correspondence between the frequency-domain resource group and the base sequence is pre-defined.

Alternatively, optionally, a correspondence between the frequency-domain resource group and the base sequence is sent by a base station to the user equipment.

102. The first user equipment generates the reference signal based on the at least one base sequence, and maps the reference signal to a time-frequency resource whose time domain is the symbol and whose frequency domain is the at least one frequency-domain resource group.

It should be understood that, the first user equipment generates the reference signal based on the base sequence, each base sequence is used to generate one reference signal sequence of the reference signal, and all generated reference signal sequences form the reference sequence.

It should be understood that after generating the reference signal, the first user equipment may map the reference signal to the time-frequency resource for sending the reference signal. Time domain of the time-frequency resource is the symbol (the symbol that carries the reference signal), and frequency domain is the at least one frequency-domain resource group.

It should be understood that, after mapping the reference signal to the time-frequency resource, the first user equipment may send the reference signal.

In this embodiment of the present application, different base sequences are determined based on different frequency-domain resource groups, and the reference signal is generated based on the base sequences, and is mapped to a corresponding time-frequency resource. This helps implement orthogonality of RSs of different UEs in different bandwidths, thereby improving RS resource multiplexing efficiency, and implementing RS resource multiplexing of a plurality of users.

Optionally, if the first user equipment and second user equipment multiplex a third frequency-domain resource group on the symbol, cyclic shifts used by the user equipment and the second user equipment to generate reference signal sequences based on a third base sequence are different. The third frequency-domain resource group is one of the at least one frequency-domain resource group, and the third base sequence is a base sequence corresponding to the third frequency-domain resource group.

In this embodiment of the present application, different cyclic shifts are configured for base sequences of different UEs on a same frequency-domain resource group, so that orthogonality of RSs of UEs in different bandwidths can be implemented on a same frequency-domain resource group. Therefore, RS resource multiplexing efficiency can be improved, and RS resource multiplexing of a plurality of users can be implemented.

Further, specific implementation of step 101 is: The first user equipment determines a first base sequence corresponding to a first frequency-domain resource group, and determines a second base sequence corresponding to a second frequency-domain resource group. In this case, specific implementation of step 102 is: The first user equipment generates a first reference signal sequence of the reference signal based on the first base sequence, and maps the first reference signal sequence to a time-frequency resource whose time domain is the symbol and whose frequency domain is the first frequency-domain resource group; and the first user equipment generates a second reference signal sequence of the reference signal based on the second base sequence, and maps the second reference signal sequence to a time-frequency resource whose time domain is the symbol and whose frequency domain is the second frequency-domain resource group.

Optionally, a cyclic shift used by the first user equipment to generate the first reference signal sequence is different from a cyclic shift used to generate the second reference signal sequence.

Alternatively, optionally, a cyclic shift used by the first user equipment to generate the first reference signal sequence is the same as a cyclic shift used to generate the second reference signal sequence.

Further, when the cyclic shift used by the first user equipment to generate the first reference signal sequence is the same as the cyclic shift used to generate the second reference signal sequence, the cyclic shift is notified by the base station to the user equipment, or the cyclic shift is determined by the user equipment based on a configuration parameter. The configuration parameter includes one or more of a UE-specific configuration parameter, a time domain-specific configuration parameter, a cell-specific configuration parameter, and a frequency domain-specific configuration parameter, and the configuration parameter cannot include only the cell-specific configuration parameter or the frequency domain-specific configuration parameter.

The method in this embodiment of the present application is further described with reference to specific embodiments below.

Figure 2:
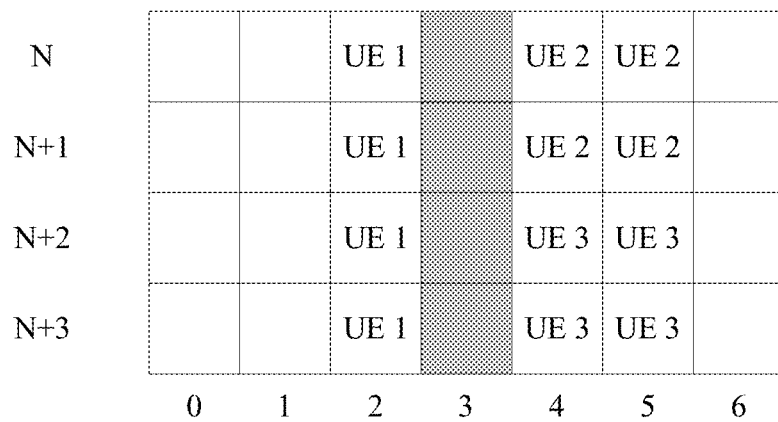
FIG. 2 is a schematic diagram of RS resource multiplexing of a plurality of users in an uplink according to an embodiment of the present application.

FIG. 2 is a schematic diagram of RS resource multiplexing of a plurality of users in an uplink according to an embodiment of the present application. As shown in FIG. 2, an RB includes four frequency-domain resource groups: N to N+3 in frequency domain, and seven symbols: 0 to 6 in time domain. UE 1 sends data on time-frequency resources whose time domains are the symbol 2 and whose frequency domains are the frequency-domain resource groups N to N+3, UE 2 sends data on time-frequency resources whose time domains are the symbols 4 and 5 and whose frequency domains are the frequency-domain resource groups N and N+1, and UE 3 sends data on time-frequency resources whose time domains are the symbols 4 and 5 and whose frequency domains are the frequency-domain resource groups N+2 and N+3. The UE 1, the UE 2, and the UE 3 send reference signals on the symbol 3 (a time-frequency resource shown in a gray grid). The UE 1 sends the reference signal on time-frequency resources whose time domains are the symbol 3 and whose frequency domains are the frequency-domain resource groups N to N+3, the UE 2 sends the reference signal on time-frequency resources whose time domains are the symbol 3 and whose frequency domains are the frequency-domain resource groups N and N+1, and the UE 3 sends the reference signal on time-frequency resources whose time domains are the symbol 3 and whose frequency domains are the frequency-domain resource groups N+2 and N+3.

In this embodiment of the present application, one reference signal may include one reference signal sequence generated based on one base sequence, or may include a plurality of reference signal sequences generated based on a plurality of base sequences.

In this embodiment of the present application, one frequency-domain resource group is corresponding to one type of base sequence, and a plurality of different frequency-domain resource groups may be corresponding to a same type of base sequence. Each frequency-domain resource group may include one or more subcarriers. A correspondence between a frequency-domain resource group and a base sequence, for example, may be that a frequency-domain resource group index is related to a base sequence index. For example, frequency-domain resource group indexes 1, 2, and 3 are corresponding to a base sequence index 1, and a frequency-domain resource group index 5 is corresponding to a base sequence index 2. It is assumed that the frequency-domain resource groups N, N+1, N+2, and N+3 in FIG. 2 are respectively corresponding to base sequences N', N'+1, N'+2, and N'+3.

In addition, it should be understood that the correspondence between a frequency-domain resource group and a base sequence may be specified in a protocol, or may be pre-defined, or may be notified by a base station to user equipment by using a configuration message. This is not limited in this embodiment of the present application.

For one UE, the UE uses, on an occupied frequency-domain resource group, a base sequence corresponding to the frequency-domain resource group to generate a reference signal sequence of a reference signal, and maps the reference signal sequence to a time-frequency resource corresponding to the frequency-domain resource group.

The UE 1 is used as an example. The UE separately generates reference signal sequences N', N'+1, N'+2, and N'+3 based on base sequences N, N+1, N+2, and N+3, and separately maps the reference signal sequences to time-frequency resources whose time domains are the symbol 3 and whose frequency domains are the frequency-domain resource groups N, N+1, N+2, and N+3.

It should be understood that a cyclic shift used by the user equipment to generate the reference signal sequence based on the base sequence may be notified by the base station to the user equipment, or may be determined by the user equipment based on a configuration parameter. The configuration parameter may include one or more of a UE-specific configuration parameter, a time domain-specific configuration parameter, a cell-specific configuration parameter, and a frequency domain-specific configuration parameter that are of the user equipment. It should be noted that the configuration parameter cannot include only the cell-specific configuration parameter or the frequency domain-specific configuration parameter.

Preferably, cyclic shifts used by same user equipment to generate reference signal sequences based on base sequences are the same. When the cyclic shifts used by the same user equipment are the same, the base station may notify the user equipment of only one type of cyclic shift, or the user equipment may determine only one type of cyclic shift based on the configuration parameter.

In addition, on a same frequency-domain resource group, different user equipments use different cyclic shifts of a same base sequence to generate respective reference signal sequences. For example, on the frequency-domain resource group N, cyclic shifts used by the UE 1 and the UE 2 to generate reference signal sequences by using the base sequence N are different.

A specific example of base sequences and cyclic shifts that are used by each UE in FIG. 2 on each frequency-domain resource group is shown in Table 1.

TABLE 1

|   |   | Frequency-domain resource group N | Frequency-domain resource group N + 1 | Frequency-domain resource group N + 2 | Frequency-domain resource group N + 3 |
|---|---|---|---|---|---|
| UE 1 | Base sequence | N' | N' + 1 | N' + 2 | N' + 3 |
|   | Cyclic shift | K | K | K | K |
| UE 2 | Base sequence | N' | N' + 1 | N/A | N/A |
|   | Cyclic shift | K + 1 | K + 1 | N/A | N/A |
| UE 3 | Base sequence | N/A | N/A | N' + 2 | N' + 3 |
|   | Cyclic shift | N/A | N/A | K + 1 | K + 1 |

As shown in Table 1, from a perspective of one UE, a same cyclic shift of a plurality of base sequences may be used for an RS corresponding to data that is sent, so that overheads of base station-side control signaling can be greatly reduced.

In this embodiment of the present application, a time-frequency resource group is used to implicitly indicate a base sequence used for generating a reference signal, so that an RS resource multiplexing rate can be increased, RS resource multiplexing of a plurality of user equipments can be implemented, and orthogonality between RSs of the plurality of users can further be ensured.

Figure 3:
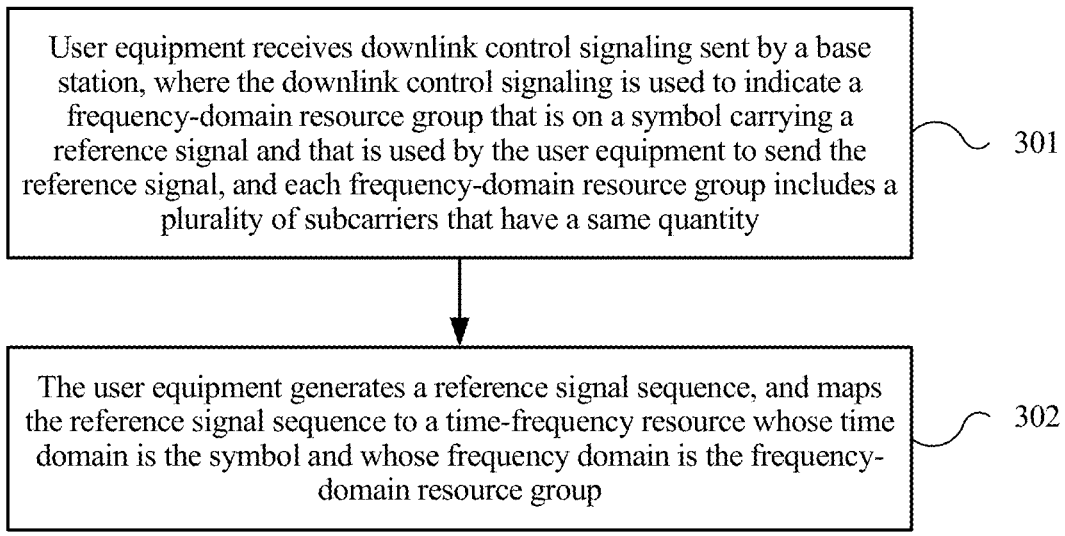
FIG. 3 is a schematic diagram of a reference signal transmission method according to an embodiment of the present application.

FIG. 3 is a schematic diagram of a reference signal transmission method according to an embodiment of the present application. The method in FIG. 3 is performed by user equipment.

301. The user equipment receives downlink control signaling sent by a base station, where the downlink control signaling is used to indicate a frequency-domain resource group that is on a symbol carrying a reference signal and that is used by the user equipment to send the reference signal, and each frequency-domain resource group includes a plurality of subcarriers that have a same quantity.

Optionally, the downlink control signaling is a user-specific UE-specific configuration message.

302. The user equipment generates a reference signal sequence, and maps the reference signal sequence to a time-frequency resource whose time domain is the symbol and whose frequency domain is the frequency-domain resource group.

In this embodiment of the present application, the user equipment generates the reference signal based on the frequency-domain resource group allocated by the base station, so that different user equipments can use different frequency-domain resources to send reference signals. Therefore, RS resource multiplexing efficiency can be improved, and RS resource multiplexing of a plurality of users can be implemented.

Optionally, the downlink control signaling carries an index of a frequency-domain comb. The method further includes: The user equipment determines the frequency-domain resource group based on a frequency-domain resource occupied by the user equipment and the frequency-domain comb, where the frequency-domain resource group includes a plurality of evenly spaced comb teeth (one comb tooth is one subcarrier). The frequency-domain comb is used to obtain one subcarrier at an interval of N subcarriers from a continuous frequency-domain resource, to obtain a plurality of evenly spaced comb teeth (subcarriers). For a same frequency-domain resource (bandwidth), different available frequency-domain resources can be obtained by using different frequency-domain combs. Different frequency-domain combs are allocated to different users, so that user equipments can obtain different frequency-domain resources in a same bandwidth, to send reference signals.

Optionally, in some embodiments, a comb structure may include M subcarriers in each N subcarriers, where intervals between a plurality of M subcarriers are equal.

For example, when M is 2, the comb structure may include two subcarriers selected from each N subcarriers. The two subcarriers are consecutive, and intervals between every two subcarriers are equal.

Figure 4:
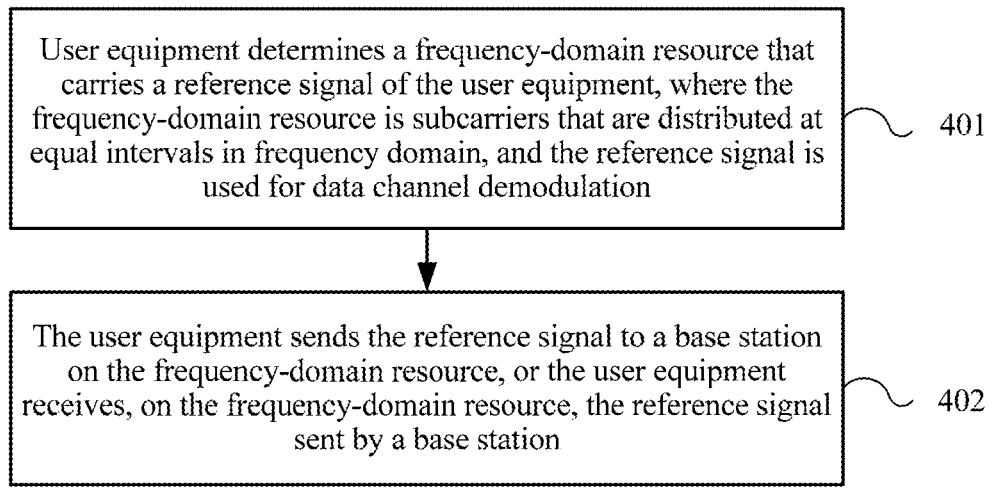
FIG. 4 is a schematic diagram of a reference signal transmission method according to an embodiment of the present application.

FIG. 4 is a schematic diagram of a reference signal transmission method according to an embodiment of the present application. The method in FIG. 4 is executed by user equipment.

401. The user equipment determines a frequency-domain resource that carries a reference signal of the user equipment, where the frequency-domain resource is subcarriers that are distributed at equal intervals in frequency domain, and the reference signal is used for data channel demodulation.

Optionally, in some embodiments, an antenna port used for transmitting the reference signal is related to an antenna port of a data channel that is demodulated by using the reference signal. Generally, antenna port numbers of the two antenna ports are the same.

402. The user equipment sends the reference signal to a base station on the frequency-domain resource, or the user equipment receives, on the frequency-domain resource, the reference signal sent by a base station.

Optionally, in some embodiments, the subcarriers that are distributed at equal intervals in frequency domain may be frequency-domain comb teeth.

Optionally, in some embodiments, a comb structure may include M subcarriers in each N subcarriers, where intervals between a plurality of M subcarriers are equal.

Optionally, in some embodiments, the user equipment may determine, based on a first parameter, the frequency-domain resource that carries the reference signal of the user equipment.

Optionally, in some embodiments, the first parameter may be one or more of a user equipment-specific parameter, a time domain-specific parameter, a cell-specific parameter, a frequency domain-specific parameter, and a first configuration parameter from the base station.

It should be understood that a value of the user equipment-specific parameter can be used to identify a related parameter of the user equipment, for example, identifier information of the user equipment or a radio network temporary identifier (RNTI).

It should be understood that a value of the cell-specific parameter can be used to identify a related parameter of a cell. For example, the cell-specific parameter may be identifier information of the cell.

It should be understood that a value of the time domain-specific parameter can be used to identify a time-domain location of a symbol of the reference signal. For example, the time domain-specific parameter may be a subframe number, a timeslot number, a mini-slot number, or a symbol.

It should be understood that a value of the frequency domain-specific parameter can be used to identify a frequency-domain location of the reference signal. For example, the frequency domain-specific parameter may be a resource block (resource block, RB) number, a resource block group (RBG) number, a subcarrier number, or a resource element group (REG) number.

Optionally, in some embodiments, the first configuration parameter may be a parameter configured by the base station for the user equipment or at least some or all of parameters configured by the base station for the user equipment.

Optionally, in some embodiments, the first configuration parameter may further be at least some or all of parameters in configuration information configured by the base station for the user equipment.

Optionally, in some embodiments, the first configuration parameter is used to determine the frequency-domain resource that carries the reference signal of the user equipment.

Optionally, in some embodiments, the first configuration parameter from the base station may be one or more of an antenna port, a frequency domain start location of a transmission comb, a transmission comb index, and a subcarrier set index.

Optionally, in some embodiments, the user equipment may determine, based on a second parameter, a cyclic shift (CS) and/or an orthogonal cover code (OCC) used for a sequence of the reference signal. The second parameter is one or more of a user equipment-specific parameter, a time domain-specific parameter, a cell-specific parameter, a frequency domain-specific parameter, and a second configuration parameter from the base station.

It should be understood that a value of the user equipment-specific parameter can be used to identify a related parameter of the user equipment, for example, identifier information of the user equipment or a radio network temporary identifier (RNTI).

It should be understood that a value of the cell-specific parameter can be used to identify a related parameter of a cell. For example, the cell-specific parameter may be identifier information of the cell.

It should be understood that a value of the time domain-specific parameter can be used to identify a time-domain location of a symbol of the reference signal. For example, the time domain-specific parameter may be a subframe number, a timeslot number, a mini-slot number, or a symbol.

It should be understood that a value of the frequency domain-specific parameter can be used to identify a frequency-domain location of the reference signal. For example, the frequency domain-specific parameter may be a resource block (resource block, RB) number, a resource block group (RBG) number, a subcarrier number, or a resource element group (REG) number.

Optionally, in some embodiments, the second configuration parameter may be a parameter configured by the base station for the user equipment or at least some or all of parameters configured by the base station for the user equipment.

Optionally, in some embodiments, the second configuration parameter may further be at least some or all of parameters in configuration information configured by the base station for the user equipment.

Optionally, in some embodiments, the second configuration parameter is used to determine the cyclic shift and/or the orthogonal cover code used for the sequence of the reference signal.

Optionally, in some embodiments, the second configuration parameter may be one or more of an antenna port, a frequency domain start location of a transmission comb, a transmission comb index, a subcarrier set index, a cyclic shift identifier, and an orthogonal cover code identifier.

It should be understood that the first parameter and the second parameter may be the same, or may be different, or the first parameter and the second parameter may partly overlap. For example, the first parameter includes the second parameter or the second parameter includes the first parameter, or some parameters in the first parameter and the second parameter are the same.

Figure 5:
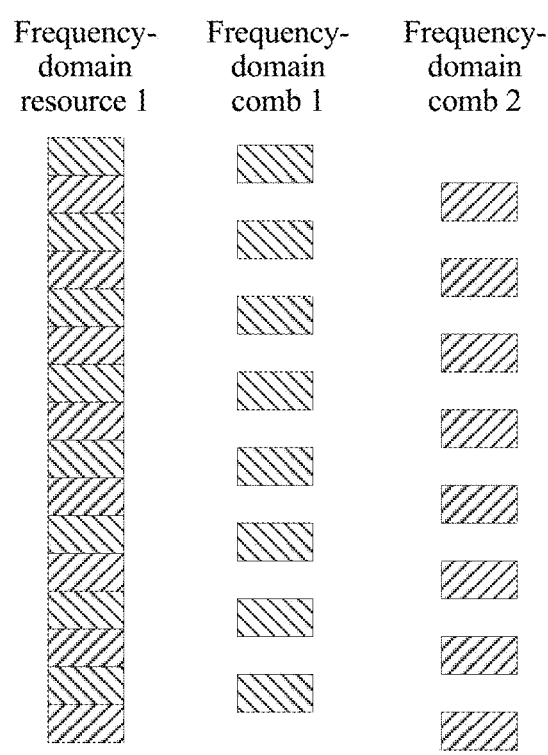
FIG. 5 is a schematic diagram of a frequency-domain resource and a frequency-domain comb according to an embodiment of the present application.

For example, FIG. 5 is a schematic diagram of a frequency-domain resource and a frequency-domain comb according to an embodiment of the present application. As shown in FIG. 5, a group of frequency-domain comb teeth shown in a frequency-domain comb 1 may be obtained based on the frequency-domain comb 1 (a first subcarrier is used as a start point, and one subcarrier is obtained at an interval of one subcarrier subsequently), and a group of frequency-domain comb teeth shown in a frequency-domain comb 2 may be obtained based on the frequency-domain comb 2 (a second subcarrier is used as a start point, and one subcarrier is obtained at an interval of one subcarrier subsequently). As shown in FIG. 5, for a same frequency-domain resource (frequency-domain resource 1), different frequency-domain resource groups may be obtained based on different frequency-domain combs.

Further, if the user equipment and second user equipment occupy a same frequency-domain resource, frequency-domain combs used by the user equipment and the second user equipment are different.

If the user equipment and the second user equipment occupy different frequency-domain resources, frequency-domain combs used by the user equipment and the second user equipment may be the same or may be different, provided that different user equipments use different frequency-domain combs on an overlapped frequency-domain resource.

In an implementation of this embodiment of the present application, the method further includes: The user equipment determines a base sequence based on a frequency-domain comb, and generating the reference signal sequence based on the base sequence, where the frequency-domain comb is corresponding to one type of base sequence. There may be a multiple-to-one or one-to-one mapping correspondence between the frequency-domain comb and the base sequence.

Optionally, the correspondence between the frequency-domain comb and the base sequence is pre-defined.

Alternatively, optionally, the correspondence between the frequency-domain comb and the base sequence is sent by the base station to the user equipment.

In another implementation of this embodiment of the present application, the user equipment may use a manner of generating the reference signal sequence based on the base sequence in the existing FDM technology. For specific implementation, refer to the prior art, and details are not described herein in this embodiment of the present application.

Optionally, in some embodiments, when there are a plurality of user equipments in a network, reference signals of the plurality of user equipments need to be orthogonal or quasi-orthogonal, and frequency-domain resources of the user equipments are the same or partly overlapped, an RS resource may be multiplexed by using a method of frequency division multiplexing (FDM) or combining FDM and code division multiplexing (CDM). A comb structure may be used for FDM, and a CS, an OCC, or a combination thereof may be used for CDM.

It should be understood that when the reference signals are orthogonal, it may be considered that sequences of the reference signals are completely uncorrelated. When the reference signals are quasi-orthogonal, there is a specific correlation between the quasi-orthogonal reference signals, but the correlation is relatively low.

For another example, FIG. 6 is a schematic diagram of multiplexing an RS resource by a plurality of user equipments by using a method of combining FDM and CDM according to an embodiment of the present application. As shown in FIG. 6, frequency-domain resources of user equipment 2, user equipment 3, and user equipment 1 partly overlap, and a frequency-domain resource of user equipment 4 partly overlaps with each of the frequency-domain resources of the user equipment 1, 2, and 3. In this case, if there are only two comb teeth in a method of FDM, RSs of the four user equipments cannot be orthogonal by using only the two comb teeth, and the RSs of the four user equipments can be orthogonal with each other in a multiplexing manner of combining FDM and CDM. As shown in FIG. 6, the user equipment 1 uses a method of combing a comb 1 with a first CS or a first OCC; the user equipment 2 uses a method of combing a comb 2 with the first CS or the first OCC; the user equipment 3 uses a method of combing the comb 2 with the first CS or the first OCC; and the user equipment 4 uses a method of combining the comb 1 with a second CS or a second OCC. In this way, the RSs of the four user equipments are orthogonal to each other by using a frequency domain and code domain multiplexing method.

The plurality of user equipments in this embodiment of the present application are not limited to a same cell. The user equipments may be located in a same cell, or may be located in different cells, and directions in which the user equipments send data may be the same or may be different, to be specific, the plurality of user equipments may be used for uplink or downlink, or some of the user equipments are used for uplink, and some user equipments are used for downlink. The solution in this embodiment may be used when the RSs of the plurality of user equipments need to be orthogonal or quasi-orthogonal in an actual network.

The user equipment may determine, by using an antenna port configured by the base station to be used for an RS of the user equipment, a comb tooth used for the RS; or by using an identifier of a transmission comb tooth configured by the base station for a user, or by using a method similar to a sounding reference signal (SRS) indication method, the base station indicates a frequency domain start location of the comb, and the user equipment determines, based on the frequency domain start location, the comb tooth for use. In addition, the base station may further use different comb teeth as some subcarrier sets, and indicate, by configuring a subcarrier set sequence number for the user equipment, a comb tooth occupied by the user equipment.

The CS and/or the OCC used for the RS sequence of the user equipment may be related to one or more of parameters such as an antenna port of the RS, a transmission comb, a frequency domain start location, and a subcarrier set sequence number. For example, it is predefined that the antenna port of the RS, the transmission comb, the frequency domain start location of the comb, or the subcarrier set sequence number is in a one-to-one correspondence with an identifier of the CS and/or the OCC. In some scenarios, the base station may directly configure the identifier of the CS and/or the OCC used for the RS sequence. In this case, the identifier of the CS and/or the OCC may be different from the identifier that is of the CS and/or the OCC and that is corresponding to the antenna port of the RS, the transmission comb, the frequency domain start location, or the subcarrier set sequence number.

In addition to the foregoing parameters, the comb tooth used for the RS and the CS and/or the OCC used for the RS sequence that are determined by the user equipment may further be related to one or more of a user equipment-specific parameter, a time domain-specific parameter, a cell-specific parameter, a network side device-specific parameter, a frequency domain-specific parameter, and a network side configuration parameter. FIG. 7 is a schematic diagram of a reference signal transmission method according to an embodiment of the present application. The method in FIG. 7 is performed by a base station.

701. The base station sends downlink control signaling to user equipment, where the downlink control signaling is used to indicate a frequency-domain resource group that is on a symbol carrying a reference signal and that is used by the user equipment to send the reference signal, and each frequency-domain resource group includes a plurality of subcarriers that have a same quantity.

702. The base station receives, on the frequency-domain resource group, a reference signal sent by the user equipment.

In this embodiment of the present application, the base station allocates the frequency-domain resource group to the user equipment, to generate the reference signal, so that different user equipments can use different frequency-domain resources to send reference signals. Therefore, RS resource multiplexing efficiency can be improved, and RS resource multiplexing of a plurality of users can be implemented.

Optionally, the downlink control signaling carries a frequency-domain comb index, and the frequency-domain comb index is used to determine the frequency-domain resource group in combination with a frequency-domain resource of the user equipment. The frequency-domain resource group includes a plurality of evenly spaced comb teeth (one comb tooth is one sub carrier).

Optionally, the frequency-domain comb is corresponding to one type of base sequence, and the frequency-domain comb index is further used by the user equipment to determine a base sequence used to generate a reference signal sequence. There may be a multiple-to-one or one-to-one correspondence between the frequency-domain comb and the base sequence.

Optionally, the base station sends the downlink control signaling by using a UE-specific message or the like.

An embodiment of the present application further discloses user equipment 1, configured to perform the method performed by the first user equipment in the embodiment shown in FIG. 1. Specifically, the user equipment 1 may include units configured to perform the method performed by the first user equipment in the embodiment shown in FIG. 1.

An embodiment of the present application further discloses user equipment 2, configured to perform the method performed by the user equipment in the embodiment shown in FIG. 3. Specifically, the user equipment 2 may include units configured to perform the method performed by the user equipment in the embodiment shown in FIG. 3.

An embodiment of the present application further discloses user equipment 3, configured to perform the method performed by the user equipment in the embodiment shown in FIG. 4. Specifically, the user equipment 3 may include units configured to perform the method performed by the user equipment in the embodiment shown in FIG. 4.

An embodiment of the present application further discloses a base station 1, configured to perform the method performed by the base station in the embodiment shown in FIG. 7. Specifically, the base station 1 may include units configured to perform the method performed by the base station in the embodiment shown in FIG. 7.

Figure 8:
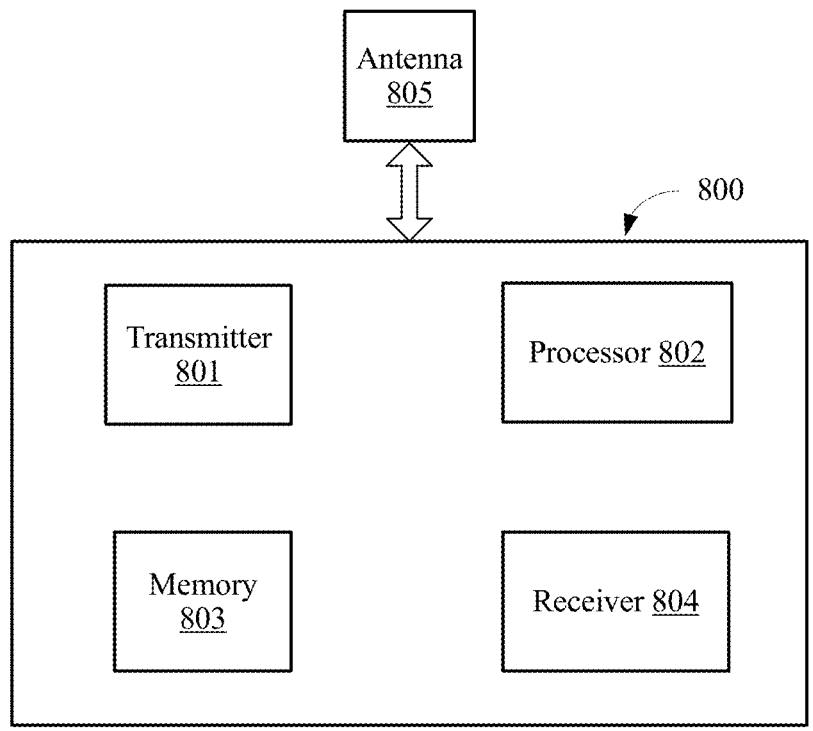
FIG. 8 is a schematic structural diagram of a physical apparatus according to an embodiment of the present application.

An embodiment of the present application further provides user equipment 4. A schematic structural diagram of a physical apparatus of the user equipment 4 may be a physical apparatus 800 in FIG. 8, and the physical apparatus includes: a processor 802, a memory 803, a transmitter 801, and a receiver 804.

The receiver 804, the transmitter 801, the processor 802, and the memory 803 are connected to each other by using a bus 806. The bus 806 may be an ISA bus, a PCI bus, an EISA bus, or the like. The bus may be classified into an address bus, a data bus, a control bus, and the like. For ease of indication, the bus is indicated by using only one double-headed arrow in FIG. 8. However, it does not mean that there is only one bus or only one type of bus. In specific application, the transmitter 801 and the receiver 804 may be coupled to an antenna 805.

Optionally, in some embodiments, the receiver 804, the transmitter 801, the processor 802, and the memory 803 may further communicate with each other by using an internal link, to transmit a control and/or data signal. The memory 803 is configured to store a program. Specifically, the program may include program code, and the program code includes a computer operation instruction. The memory 803 may include a read-only memory and a random access memory, and provide an instruction and data for the processor 802. The memory 803 may include a high-speed random access memory (RAM for short), or may further include a non-transitory memory (non-transitory memory) such as at least one magnetic disk storage.

The processor 802 is configured to execute the program stored in the memory 803.

Specifically, in the user equipment 4, the processor 802 may be configured to perform the method in the embodiment shown in FIG. 1, and implement functions of the first user equipment in the embodiment shown in FIG. 1.

The processor 802 may be an integrated circuit chip and has a signal processing capability. In an implementation process, steps in the foregoing method may be completed by using an integrated logic circuit of hardware in the processor 802 or an instruction in a form of software. The processor 802 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware assembly. The processor 802 may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 803. The processor 802 reads information in the memory 803, and completes the steps of the foregoing methods in combination with hardware of the processor.

An embodiment of the present application further provides user equipment 5. A schematic structural diagram of a physical apparatus of the user equipment 5 may be shown in FIG. 8, and physical units included in the user equipment 5 are similar to those of the user equipment 4. Details are not described again.

Specifically, in the user equipment 5, the processor 802 may be configured to perform the method in the embodiment shown in FIG. 3, and implement functions of the user equipment in the embodiment shown in FIG. 3.

An embodiment of the present application further provides user equipment 6. A schematic structural diagram of a physical apparatus of the user equipment 6 may be shown in FIG. 8, and physical units included in the user equipment 6 are similar to those of the user equipment 4. Details are not described again.

Specifically, in the user equipment 6, the processor 802 may be configured to perform the method in the embodiment shown in FIG. 4, and implement functions of the user equipment in the embodiment shown in FIG. 4.

An embodiment of the present application further provides a base station 2. A schematic structural diagram of a physical apparatus of the base station 2 may be shown in FIG. 8, and physical units included in the base station 2 are similar to those of the user equipment 4. Details are not described again.

Specifically, in the base station 2, the processor 802 may be configured to perform the method in the embodiment shown in FIG. 7, and implement functions of the base station in the embodiment shown in FIG. 7.

An embodiment of the present application provides a reference signal transmission apparatus 1, and the apparatus includes a processor and a memory.

Optionally, the apparatus 1 further includes a receiver and a transmitter.

Specifically, in the apparatus 1, the memory is configured to store program code, and the processor is configured to invoke the program code to implement the method in the embodiment shown in FIG. 1.

An embodiment of the present application provides a reference signal transmission apparatus 2, and the apparatus includes a processor and a memory.

Optionally, the apparatus 2 further includes a receiver and a transmitter.

Specifically, in the apparatus 2, the memory is configured to store program code, and the processor is configured to invoke the program code to implement the method in the embodiment shown in FIG. 3.

An embodiment of the present application provides a reference signal transmission apparatus 3, and the apparatus includes a processor and a memory.

Optionally, the apparatus 3 further includes a receiver and a transmitter.

Specifically, in the apparatus 3, the memory is configured to store program code, and the processor is configured to invoke the program code to implement the method in the embodiment shown in FIG. 4.

An embodiment of the present application provides a reference signal transmission apparatus 4, and the apparatus includes a processor and a memory.

Optionally, the apparatus 4 further includes a receiver and a transmitter.

Specifically, in the apparatus 4, the memory is configured to store program code, and the processor is configured to invoke the program code to implement the method in the embodiment shown in FIG. 7.

An embodiment of the present application further provides a computer readable storage medium 1, where the computer readable storage medium stores one or more programs, the one or more programs include an instruction, and when executed by a portable electronic device that includes a plurality of application programs, the instruction enables the portable electronic device to perform the method in the embodiment shown in FIG. 1.

An embodiment of the present application further provides a computer readable storage medium 2, where the computer readable storage medium stores one or more programs, the one or more programs include an instruction, and when executed by a portable electronic device that includes a plurality of application programs, the instruction enables the portable electronic device to perform the method in the embodiment shown in FIG. 3.

An embodiment of the present application further provides a computer readable storage medium 3, where the computer readable storage medium stores one or more programs, the one or more programs include an instruction, and when executed by a portable electronic device that includes a plurality of application programs, the instruction enables the portable electronic device to perform the method in the embodiment shown in FIG. 4.

An embodiment of the present application further provides a computer readable storage medium 4, where the computer readable storage medium stores one or more programs, the one or more programs include an instruction, and when executed by a portable electronic device that includes a plurality of application programs, the instruction enables the portable electronic device to perform the method in the embodiment shown in FIG. 7.

An embodiment of the present application further provides a communications system, including a base station and user equipment. The user equipment may be the user equipment 1, the user equipment 2, or the user equipment 3 in the foregoing embodiments, and the base station may be the base station 1 or the base station 2 in the foregoing embodiments.

Figure 9:
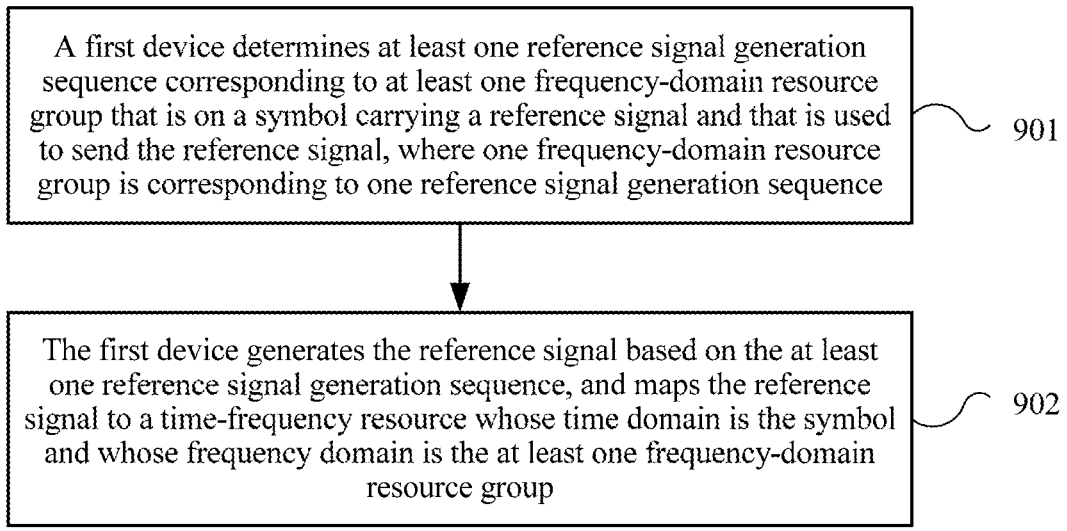
FIG. 9 is a schematic diagram of still another reference signal transmission method according to an embodiment of the present application.

FIG. 9 is a schematic diagram of a reference signal transmission method according to an embodiment of the present application. The method in FIG. 9 is performed by a first device. The first device may be user equipment or a network side device, such as a base station.

901. The first device determines at least one reference signal generation sequence corresponding to at least one frequency-domain resource group that is on a symbol carrying a reference signal and that is used to send the reference signal.

One frequency-domain resource group is corresponding to one reference signal generation sequence.

It should be understood that, in this embodiment of the present application, one frequency-domain resource group may include a plurality of frequency-domain subcarriers, and each frequency-domain resource group may include a same quantity of subcarriers, or may include different quantities of subcarriers.

It should be understood that, in this embodiment of the present application, the symbol used to carry the reference signal may include one or more symbols.

It should be understood that the reference signal generation sequence may include different types of sequences, for example, a ZC sequence or a pseudo-random sequence, or may be another sequence that meets a correlation requirement. This is not limited in this embodiment of the present application.

The first device sends the reference signal on the at least one frequency-domain resource group. Each frequency-domain resource group is used to send one reference signal sequence of the reference signal, and at least one reference signal sequence sent on the at least one frequency-domain resource group forms the reference signal. Each reference signal sequence is generated by using one reference signal generation sequence, and the first device needs to determine that a quantity of reference signal generation sequences is the same as a quantity of frequency-domain resource groups. One frequency-domain resource group is corresponding to one reference signal generation sequence, and different frequency-domain resource groups may use a same reference signal generation sequence or different reference signal generation sequences. It should be understood that one frequency-domain resource group is corresponding to one reference signal generation sequence, and there may be a one-to-one or multiple-to-one correspondence between the frequency-domain resource group and the reference signal generation sequence. For example, one frequency-domain resource group index is corresponding to one reference signal generation sequence index, and the frequency-domain resource group index may be related to the reference signal generation sequence index. In a specific example, frequency-domain resource group indexes 1, 2, and 3 are corresponding to a reference signal generation sequence index 1, and a frequency-domain resource group index 4 is corresponding to a reference signal generation sequence index 2. In other words, a same reference signal generation sequence or different reference signal generation sequences may be used for different frequency-domain resource groups.

Optionally, in an embodiment, the reference signal generation sequence is determined by the first device based on a second parameter set, and parameters in the second parameter set include one or more of a user equipment-specific parameter, a time domain-specific parameter, a cell-specific parameter, a network side device-specific parameter, a frequency domain-specific parameter, a network side configuration parameter, and a combination parameter. The combination parameter is a combination of a plurality of parameters in the user equipment-specific parameter, the time domain-specific parameter, the cell-specific parameter, the network side device-specific parameter, the frequency domain-specific parameter, and the network side configuration parameter.

Alternatively, optionally, in another embodiment, the correspondence between the frequency-domain resource group and the reference signal generation sequence is pre-defined. For example, a mapping relationship table between the reference signal generation sequence and a frequency-domain resource location of the frequency-domain resource group may be specified in a protocol.

Alternatively, optionally, in still another embodiment, when the first device is user equipment, the correspondence between the frequency-domain resource group and the reference signal generation sequence is sent by a network side device to the first user equipment.

902. The first device generates the reference signal based on the at least one reference signal generation sequence, and maps the reference signal to a time-frequency resource whose time domain is the symbol and whose frequency domain is the at least one frequency-domain resource group.

It should be understood that the first device generates the reference signal based on the reference signal generation sequence, each reference signal generation sequence is used to generate one reference signal sequence of the reference signal, and all generated reference signal sequences form the reference signal.

It should be understood that, after generating the reference signal, the first device may map the reference signal to the time-frequency resource for sending the reference signal. Time domain of the time-frequency resource is the symbol (the symbol that carries the reference signal), and frequency domain is the at least one frequency-domain resource group.

It should be understood that, after mapping the reference signal to the time-frequency resource, the first device may send the reference signal.

In this embodiment of the present application, different reference signal generation sequences are determined based on different frequency-domain resource groups, and the reference signal is generated based on the reference signal generation sequences, and is mapped to a corresponding time-frequency resource. This helps implement RS orthogonality/quasi-orthogonality for different devices in different bandwidths, thereby improving RS resource multiplexing efficiency, and implementing RS resource multiplexing of a plurality of devices.

Optionally, in an embodiment, when both the first device and a second device map reference signals to a time-frequency resource whose time domain is the symbol and whose frequency domain is a third frequency-domain resource group, cyclic shifts or orthogonal cover codes used by the first device and the second device to generate reference signals based on a third reference signal generation sequence are different. The third frequency-domain resource group is one of the at least one frequency-domain resource group, and the third reference signal generation sequence is a reference signal generation sequence corresponding to the third frequency-domain resource group.

Optionally, in a specific implementation of this embodiment, the cyclic shift or the orthogonal cover code is determined by the first device based on a first parameter set, and parameters in the first parameter set include one or more of a user equipment-specific parameter, a time domain-specific parameter, a cell-specific parameter, a network side device-specific parameter, a frequency domain-specific parameter, and a network side configuration parameter.

Alternatively, optionally, in another specific implementation of this embodiment, when the first device is user equipment, the cyclic shift or the orthogonal cover code is notified to the first device by a network side device connected to the first device.

Optionally, in another embodiment, when both the first device and a second device map reference signals to a time-frequency resource whose time domain is the symbol and whose frequency domain is a third frequency-domain resource group, a reference signal generation sequence corresponding to the first device on the third frequency-domain resource group is different from a reference signal generation sequence corresponding to the second device on the third frequency-domain resource group.

For example, the third frequency-domain resource group is one of the at least one frequency-domain resource group, a third reference signal generation sequence is the reference signal generation sequence corresponding to the first device on the third frequency-domain resource group, a fourth reference signal generation sequence is the reference signal generation sequence corresponding to the second device on the third frequency-domain resource group. Both the first device and the second device map the reference signals to the time-frequency resource whose time domain is the symbol and whose frequency domain is the third frequency-domain resource group. In this case, the first device may generate the reference signal based on the third reference signal generation sequence, and the second device may generate the reference signal based on the fourth reference signal generation sequence.

It should be understood that, the first device may be first user equipment, the second device may be second user equipment, and the first user equipment and the second user equipment may connect to/reside on a same network side device or different network side devices; or the first device may be a first network side device, and the second device may be a second network side device; or the first device may be a first network side device, the second device may be second user equipment, and a network side device to/on which the second user equipment connects/resides may be the same as or different from the first network side device; or the first device may be first user equipment, the second device may be a second network side device, and a network side device to/on which the first user equipment connects/resides may be the same as or different from the second network side device.

It should be understood that the network side device may be a device that can schedule and control the user equipment, such as an evolved NodeB (eNB) in LTE or a transmission/reception point (TRP) in NR.

Optionally, in an embodiment, the reference signal generation sequence is determined by the first device based on a second parameter set, and parameters in the second parameter set include one or more of a user equipment-specific parameter, a time domain-specific parameter, a cell-specific parameter, a network side device-specific parameter, a frequency domain-specific parameter, a network side configuration parameter, and a combination parameter. The combination parameter is a combination of a plurality of parameters in the user equipment-specific parameter, the time domain-specific parameter, the cell-specific parameter, the network side device-specific parameter, the frequency domain-specific parameter, and the network side configuration parameter.

Optionally, in another embodiment, a correspondence between the frequency-domain resource group and the reference signal generation sequence is pre-defined.

Optionally, in still another embodiment, when the first device is user equipment, a correspondence between the frequency-domain resource group and the reference signal generation sequence is sent to the first device by a network side device connected to the first device.

In this embodiment of the present application, different cyclic shifts or orthogonal cover codes are configured for reference signal generation sequences of different devices on a same frequency-domain resource group, or different reference signal generation sequences are configured for different devices on a same frequency-domain resource group, so that devices that occupy different bandwidths for transmission implement RS orthogonality on a same frequency-domain resource group. Therefore, RS resource multiplexing efficiency can be improved, and RS resource multiplexing by a plurality of devices can be implemented.

Further, specific implementation of step 901 is: The first device determines a first reference signal generation sequence corresponding to a first frequency-domain resource group, and determines a second reference signal generation sequence corresponding to a second frequency-domain resource group. In this case, specific implementation of step 902 is: The first device generates the first reference signal sequence of the reference signal based on the first reference signal generation sequence, and maps the first reference signal sequence to a time-frequency resource whose time domain is the symbol and whose frequency domain is the first frequency-domain resource group; and the first user equipment generates the second reference signal sequence of the reference signal based on the second reference signal generation sequence, and maps the second reference signal sequence to a time-frequency resource whose time domain is the symbol and whose frequency domain is the second frequency-domain resource group.

It should be understood that a cyclic shift or an orthogonal cover code used by the first device to generate the first reference signal sequence may be the same or different from a cyclic shift or an orthogonal cover code used to generate the second reference signal sequence.

The method in this embodiment of the present application is further described with reference to specific embodiments below.

FIG. 10 is a schematic diagram of RS resource multiplexing of a plurality of devices according to an embodiment of the present application. As shown in FIG. 10, an RB includes four frequency-domain resource groups: N to N+3 in frequency domain, and seven symbols: 0 to 6 in time domain. A device 1 sends data on time-frequency resources whose time domains are the symbol 2 and whose frequency domains are the frequency-domain resource groups N to N+3, a device 2 sends data on time-frequency resources whose time domains are the symbols 4 and 5 and whose frequency domains are the frequency-domain resource groups N and N+1, and a device 3 sends data on time-frequency resources whose time domains are the symbols 4 and 5 and whose frequency domains are the frequency-domain resource groups N+2 and N+3. The device 1, the device 2, and the device 3 send reference signals on the symbol 3 (a time-frequency resource shown in a gray grid). The device 1 sends the reference signal on time-frequency resources whose time domains are the symbol 3 and whose frequency domains are the frequency-domain resource groups N to N+3, the device 2 sends the reference signal on time-frequency resources whose time domains are the symbol 3 and whose frequency domains are the frequency-domain resource groups N and N+1, and the device 3 sends the reference signal on time-frequency resources whose time domains are the symbol 3 and whose frequency domains are the frequency-domain resource groups N+2 and N+3.

In this embodiment of the present application, one reference signal may include one reference signal sequence generated based on one reference signal generation sequence, or may include a plurality of reference signal sequences generated based on a plurality of reference signal generation sequences.

In this embodiment of the present application, one frequency-domain resource group is corresponding to one reference signal generation sequence, and frequency-domain resource groups in a plurality of different frequency-domain resource groups may be corresponding to different reference signal generation sequences, or may be corresponding to a same reference signal generation sequence. Each frequency-domain resource group may include one or more subcarriers. A correspondence between a frequency-domain resource group and a reference signal generation sequence, for example, may be that a frequency-domain resource group index is related to a reference signal generation sequence index. For example, frequency-domain resource group indexes 1, 2, and 3 are corresponding to a reference signal generation sequence index 1, and a frequency-domain resource group index 5 is corresponding to a reference signal generation sequence index 2. It is assumed that the frequency-domain resource groups N, N+1, N+2, and N+3 in FIG. 10 are respectively corresponding to reference signal generation sequences M0, M1, M2, and M3. M0, M1, M2, and M3 may be the same, and may be different from each other, or may be partly the same.

In addition, it should be understood that a reference signal generation sequence used by a device on a specific frequency-domain resource group may be determined by the device based on a second parameter set. Parameters in the second parameter set include one or more of a user equipment-specific parameter, a time domain-specific parameter, a cell-specific parameter, a network side device-specific parameter, a frequency domain-specific parameter, a network side configuration parameter, and a combination parameter. The combination parameter is a combination of a plurality of parameters in the user equipment-specific parameter, the time domain-specific parameter, the cell-specific parameter, the network side device-specific parameter, the frequency domain-specific parameter, and the network side configuration parameter. Alternatively, the second parameter set may be specified in a protocol, or may be notified to the user equipment by a network side device when the device is user equipment. This is not limited in this embodiment of the present application.

For one device, the device uses, on an occupied frequency-domain resource group, a reference signal generation sequence corresponding to the frequency-domain resource group to generate a reference signal sequence of a reference signal, and maps the reference signal sequence to a time-frequency resource corresponding to the frequency-domain resource group.

The device 1 is used as an example. The device 1 separately generates reference signal sequences based on the reference signal generation sequences M0, M1, M2, and M3, and separately maps the reference signal sequences to time-frequency resources whose time domains are the symbol 3 and whose frequency domains are the frequency-domain resource groups N, N+1, N+2, and N+3.

It should be understood that, when generating the reference signal sequences based on the reference signal generation sequences, the device may use a corresponding orthogonal parameter, to ensure orthogonality/quasi-orthogonality between reference signals of different devices. For example, when a used reference signal generation sequence is a ZC sequence, the orthogonal parameter is a cyclic shift; or when a used reference signal generation sequence is a pseudo-random sequence, the orthogonal parameter is an orthogonal cover code. The used orthogonal parameter may be determined by the device based on a first parameter set. Parameters in the first parameter set include one or more of a user equipment-specific parameter, a time domain-specific parameter, a cell-specific parameter, a network side device-specific parameter, a frequency domain-specific parameter, and a network side configuration parameter. When the device is user equipment, the first parameter set may be notified to the user equipment by a network side device. This is not limited in this embodiment of the present application.

Orthogonal parameters used by a same device to generate reference signal sequences based on reference signal generation sequences may be the same, or may be different, and the device preferably uses a same orthogonal parameter. When the orthogonal parameters used by the same device are the same, the device may determine a cyclic shift based on the parameter. In this case, if the device is user equipment, the network side device may notify the user equipment of only one orthogonal parameter.

On a same frequency-domain resource group, different devices may use different orthogonal parameters of a same reference signal generation sequence to generate respective reference signal sequences. For example, on the frequency-domain resource group N, orthogonal parameters used by the device 1 and the device 2 to generate reference signal sequences by using the reference signal generation sequence M0 are different. In addition, on a same frequency-domain resource group, different devices may use different reference signal generation sequences to generate respective reference signal sequences. For example, on the frequency-domain resource group N, the device 1 and the device 2 separately generate respective reference signal sequences by using the reference signal generation sequences M1 and M2.

Five specific examples of reference signal generation sequences and orthogonal parameters used by each device in FIG. 10 on each frequency-domain resource group are shown in Tables 2, 3, 4, 5, and 6.

TABLE 2

|  |  | Frequency-domain resource group N | Frequency-domain resource group N + 1 | Frequency-domain resource group N + 2 | Frequency-domain resource group N + 3 |
|---|---|---|---|---|---|
| Device 1 | Reference signal generation sequence | M0 | M1 | M2 | M3 |
|  | Orthogonal parameter | K0 | K0 | K0 | K0 |
| Device 2 | Reference signal generation sequence | M0 | M1 | N/A | N/A |
|  | Orthogonal parameter | K1 | K1 | N/A | N/A |
| Device 3 | Reference signal generation sequence | N/A | N/A | M2 | M3 |
|  | Orthogonal parameter | N/A | N/A | K1/K2 | K1/K2 |

TABLE 3

|  |  | Frequency-domain resource group N | Frequency-domain resource group N + 1 | Frequency-domain resource group N + 2 | Frequency-domain resource group N + 3 |
|---|---|---|---|---|---|
| Device 1 | Reference signal generation sequence | M0 | M1 | M2 | M3 |
|  | Orthogonal parameter | K0 | K1 | K2 | K3 |
| Device 2 | Reference signal generation sequence | M0 | M1 | N/A | N/A |
|  | Orthogonal parameter | K4 | K5 | N/A | N/A |
| Device 3 | Reference signal generation sequence | N/A | N/A | M2 | M3 |
|  | Orthogonal parameter | N/A | N/A | K6 | K7 |

TABLE 4

|  |  | Frequency-domain resource group N | Frequency-domain resource group N + 1 | Frequency-domain resource group N + 2 | Frequency-domain resource group N + 3 |
|---|---|---|---|---|---|
| Device 1 | Reference signal generation sequence | M0 | M0 | M0 | M0 |

TABLE 4-continued

|  |  | Frequency-domain resource group N | Frequency-domain resource group N + 1 | Frequency-domain resource group N + 2 | Frequency-domain resource group N + 3 |
|---|---|---|---|---|---|
| Device 2 | Orthogonal parameter | K0 | K0 | K0 | K0 |
|  | Reference signal generation sequence | M0 | M0 | N/A | N/A |
| Device 3 | Orthogonal parameter | K1 | K1 | N/A | N/A |
|  | Reference signal generation sequence | N/A | N/A | M0 | M0 |
|  | Orthogonal parameter | N/A | N/A | K1/K2 | K1/K2 |

TABLE 5

|  |  | Frequency-domain resource group N | Frequency-domain resource group N + 1 | Frequency-domain resource group N + 2 | Frequency-domain resource group N + 3 |
|---|---|---|---|---|---|
| Device 1 | Reference signal generation sequence | M0 | M1 | M2 | M3 |
| Device 2 | Reference signal generation sequence | M4 | M5 | N/A | N/A |
| Device 3 | Reference signal generation sequence | N/A | N/A | M6 | M7 |

TABLE 6

|  |  | Frequency-domain resource group N | Frequency-domain resource group N + 1 | Frequency-domain resource group N + 2 | Frequency-domain resource group N + 3 |
|---|---|---|---|---|---|
| Device 1 | Reference signal generation sequence | M0 | M0 | M0 | M0 |
| Device 2 | Reference signal generation sequence | M1 | M1 | N/A | N/A |
| Device 3 | Reference signal generation sequence | N/A | N/A | M2 | M2 |

As shown in Table 2, from a perspective of one device, a same orthogonal parameter of a plurality of reference signal generation sequences may be used for an RS corresponding to data that is sent.

As shown in Table 3, from a perspective of one device, different orthogonal parameters of a plurality of reference signal generation sequences may be used for an RS corresponding to data that is sent.

As shown in Table 4, from a perspective of one device, on different frequency-domain resource groups, a same reference signal generation sequence may be used for an RS corresponding to data that is sent.

As shown in Table 5, from a perspective of different devices, on a same frequency-domain resource group, different reference signal generation sequences may be used for an RS corresponding to data that is sent. From a perspective of one device, on different frequency-domain resource groups, different reference signal generation sequences may be used for an RS corresponding to data that is sent.

As shown in Table 6, from a perspective of different devices, on a same frequency-domain resource group, different reference signal generation sequences may be used for an RS corresponding to data that is sent. From a perspective of one device, on different frequency-domain resource groups, a same reference signal generation sequence may be used for an RS corresponding to data that is sent.

In this embodiment of the present application, a reference signal generation sequence used to generate a reference signal is corresponding to a frequency-domain resource group, so that an RS resource multiplexing rate can be increased, RS resource multiplexing of a plurality of devices can be implemented, and orthogonality/quasi-orthogonality between RSs of the plurality of devices can further be ensured.

An embodiment of the present application further discloses a device 1, configured to perform the method performed by the first device in the embodiment shown in FIG. 9. The device may include units configured to perform the method performed by the first device in the embodiment shown in FIG. 9.

Specifically, the device may include a determining unit and a signal generation unit. The determining unit is configured to determine at least one reference signal generation sequence corresponding to at least one frequency-domain resource group that is on a symbol carrying a reference signal and that is used to send the reference signal, where one frequency-domain resource group is corresponding to one reference signal generation sequence. The signal generation unit is configured to generate the reference signal based on the at least one reference signal generation sequence, and map the reference signal to a time-frequency resource whose time domain is the symbol and whose frequency domain is the at least one frequency-domain resource group.

Optionally, in an embodiment, when both the first device and a second device map reference signals to a time-frequency resource whose time domain is the symbol and whose frequency domain is a third frequency-domain resource group, cyclic shifts or orthogonal cover codes used by the first device and the second device to generate the reference signals based on a third reference signal generation sequence are different. The third frequency-domain resource group is one of the at least one frequency-domain resource group, and the third reference signal generation sequence is a reference signal generation sequence corresponding to the third frequency-domain resource group.

Optionally, in an implementation of this embodiment, the cyclic shift or the orthogonal cover code is determined by the first device based on a first parameter set, and parameters in the first parameter set include one or more of a user equipment-specific parameter, a time domain-specific parameter, a cell-specific parameter, a network side device-specific parameter, a frequency domain-specific parameter, and a network side configuration parameter.

Alternatively, optionally, in another implementation of this embodiment, when the first device is user equipment, the cyclic shift or the orthogonal cover code is notified to the first device by a network side device connected to the first device.

Optionally, in another embodiment, when both the first device and a second device map reference signals to a time-frequency resource whose time domain is the symbol and whose frequency domain is a third frequency-domain resource group, a reference signal generation sequence corresponding to the first device on the third frequency-domain resource group is different from a reference signal generation sequence corresponding to the second device on the third frequency-domain resource group.

Optionally, the determining unit is specifically configured to: determine a first reference signal generation sequence corresponding to a first frequency-domain resource group, and determine a second reference signal generation sequence corresponding to a second frequency-domain resource group. The signal generation unit is specifically configured to: generate a first reference signal sequence of the reference signal based on the first reference signal generation sequence, and map the first reference signal sequence to a time-frequency resource whose time domain is the symbol and whose frequency domain is the first frequency-domain resource group; and generate a second reference signal sequence of the reference signal based on the second reference signal generation sequence, and map the second reference signal sequence to a time-frequency resource whose time domain is the symbol and whose frequency domain is the second frequency-domain resource group.

Optionally, the reference signal generation sequence is determined by the device based on a second parameter set, and parameters in the second parameter set include one or more of a user equipment-specific parameter, a time domain-specific parameter, a cell-specific parameter, a network side device-specific parameter, a frequency domain-specific parameter, a network side configuration parameter, and a combination parameter. The combination parameter is a combination of a plurality of parameters in the user equipment-specific parameter, the time domain-specific parameter, the cell-specific parameter, the network side device-specific parameter, the frequency domain-specific parameter, and the network side configuration parameter.

Alternatively, optionally, a correspondence between the frequency-domain resource group and the reference signal generation sequence is pre-defined.

Alternatively, optionally, when the device is user equipment, a correspondence between the frequency-domain resource group and the reference signal generation sequence is sent to the device by a network side device connected to the device.

An embodiment of the present application further discloses a device 2. A schematic structural diagram of a physical apparatus of the device may be a physical apparatus 800 in FIG. 8, and the physical apparatus 800 includes: a processor 802, a memory 803, a transmitter 801, and a receiver 804.

The receiver 804, the transmitter 801, the processor 802, and the memory 803 are connected to each other by using a bus 806. The bus 806 may be an ISA bus, a PCI bus, an EISA bus, or the like. The bus may be classified into an address bus, a data bus, a control bus, and the like. For ease of indication, the bus is indicated by using only one double-headed arrow in FIG. 6. However, it does not mean that there is only one bus or only one type of bus. In specific application, the transmitter 801 and the receiver 804 may be coupled to an antenna 805.

Optionally, in some embodiments, the receiver 804, the transmitter 801, the processor 802, and the memory 803 may further communicate with each other by using an internal link to transmit a control and/or data signal.

The memory 803 is configured to store a program. Specifically, the program may include program code, and the program code includes a computer operation instruction. The memory 803 may include a read-only memory and a random access memory, and provide an instruction and data for the processor 802. The memory 803 may include a high-speed RAM memory, and may further include a non-transitory memory (non-transitory memory), for example, at least one disk memory.

The processor 802 is configured to execute the program stored in the memory 803.

Specifically, in the device, the processor 802 is configured to perform the following method:

determining at least one reference signal generation sequence corresponding to at least one frequency-domain resource group that is on a symbol carrying a reference signal and that is used to send the reference signal, where one frequency-domain resource group is corresponding to one reference signal generation sequence; and generating the reference signal based on the at least one reference signal generation sequence, and mapping the reference signal to a time-frequency resource whose time domain is the symbol and whose frequency domain is the at least one frequency-domain resource group.

The foregoing method that is performed by the first device and that is disclosed in the embodiment in FIG. 9 of the present application may be applied to the processor 802, or may be implemented by the processor 802. The processor 802 may be an integrated circuit chip and has a signal processing capability. In an implementation process, steps in the foregoing method may be completed by using an integrated logic circuit of hardware in the processor 802 or an instruction in a form of software. The processor 802 may be a general purpose processor, including a CPU, a network processor (NP), and the like; or may be a DSP, an ASIC, an FPGA or another programmable logic device, a discrete gate or a transistor logic device, or a discrete hardware component. The processor 802 may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 803. The processor 802 reads information in the memory 803, and completes the steps of the foregoing methods in combination with hardware of the processor.

Optionally, in an embodiment, when both a first device and the second device map reference signals to a time-frequency resource whose time domain is the symbol and whose frequency domain is a third frequency-domain resource group, cyclic shifts or orthogonal cover codes used by the first device and the second device to generate reference signals based on a third reference signal generation sequence are different. The third frequency-domain resource group is one of the at least one frequency-domain resource group, and the third reference signal generation sequence is a reference signal generation sequence corresponding to the third frequency-domain resource group.

Optionally, in a specific implementation of this embodiment, the cyclic shift or the orthogonal cover code is determined by the first device based on a first parameter set, and parameters in the first parameter set include one or more of a user equipment-specific parameter, a time domain-specific parameter, a cell-specific parameter, a network side device-specific parameter, a frequency domain-specific parameter, and a network side configuration parameter.

Alternatively, optionally, in another specific implementation of this embodiment, when the first device is user equipment, the cyclic shift or the orthogonal cover code is notified to the first device by a network side device connected to the first device.

Optionally, in another embodiment, when both a first device and the second device map reference signals to a time-frequency resource whose time domain is the symbol and whose frequency domain is a third frequency-domain resource group, a reference signal generation sequence corresponding to the first device on the third frequency-domain resource group is different from a reference signal generation sequence corresponding to the second device on the third frequency-domain resource group.

Optionally, in an embodiment, the reference signal generation sequence is determined by the first device based on a second parameter set, and parameters in the second parameter set include one or more of a user equipment-specific parameter, a time domain-specific parameter, a cell-specific parameter, a network side device-specific parameter, a frequency domain-specific parameter, a network side configuration parameter, and a combination parameter. The combination parameter is a combination of a plurality of parameters in the user equipment-specific parameter, the time domain-specific parameter, the cell-specific parameter, the network side device-specific parameter, the frequency domain-specific parameter, and the network side configuration parameter.

Optionally, in another embodiment, a correspondence between the frequency-domain resource group and the reference signal generation sequence is pre-defined.

Optionally, in still another embodiment, when the first device is user equipment, a correspondence between the frequency-domain resource group and the reference signal generation sequence is sent to the first device by the network side device connected to the first device.

Further, specific implementation of determining, by the processor 802, the at least one reference signal generation sequence corresponding to the at least one frequency-domain resource group that is on the symbol carrying the reference signal and that is used to send the reference signal is: The processor 802 determines a first reference signal generation sequence corresponding to a first frequency-domain resource group, and determines a second reference signal generation sequence corresponding to a second frequency-domain resource group. In this case, specific implementation of generating, by the processor 802, the reference signal based on the at least one reference signal generation sequence, and mapping the reference signal to the time-frequency resource whose time domain is the symbol and whose frequency domain is the at least one frequency-domain resource group is: The processor 802 generates a first reference signal sequence of the reference signal based on the first reference signal generation sequence, and maps the first reference signal sequence to a time-frequency resource whose time domain is the symbol and whose frequency domain is the first frequency-domain resource group; and generates a second reference signal sequence of the reference signal based on the second reference signal generation sequence, and maps the second reference signal sequence to a time-frequency resource whose time domain is the symbol and whose frequency domain is the second frequency-domain resource group.

An embodiment of the present application further provides a computer readable storage medium 4, where the computer readable storage medium stores one or more programs, the one or more programs include an instruction, and when executed by a portable electronic device that includes a plurality of application programs, the instruction enables the portable electronic device to perform the method in the embodiment shown in FIG. 9.

An embodiment of the present application further provides a communications system, including the foregoing device 1 or device 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A reference signal transmission method, comprising:
determining, by first user equipment, a first base sequence corresponding to a first frequency-domain resource group and a second base sequence corresponding to a second frequency-domain resource group, wherein the first frequency-domain resource group and the second frequency-domain resource group correspond to two different frequency-domain combs on a frequency-domain resource that is on a symbol to carry a reference signal and that is used to send the reference signal, wherein the first frequency-domain resource group and the second frequency-domain resource group comprise a same quantity of sub carriers; and
generating, by the first user equipment, the reference signal based on the first base sequence and the second base sequence, and mapping the reference signal to a time-frequency resource whose time domain is the symbol and whose frequency domain comprises the first frequency-domain resource group and the second frequency-domain resource group.

2. The method according to claim 1, wherein:
when both the first user equipment and a second user equipment generate reference signal sequences on the first frequency-domain resource group, cyclic shifts used by the first user equipment and the second user equipment to generate the reference signal sequences based on the first base sequence are different.

3. The method according to claim 1, wherein:
generating, by the first user equipment, the reference signal based on first base sequence and the second base sequence, and mapping the reference signal to a time-frequency resource whose time domain is the symbol carrying the reference signal and whose frequency domain comprises the first frequency-domain resource group and the second frequency-domain resource group comprises:
generating, by the first user equipment, a first reference signal sequence of the reference signal based on the first base sequence, and mapping the first reference signal sequence to a time-frequency resource whose time domain is the symbol and whose frequency domain is the first frequency-domain resource group, and
generating, by the first user equipment, a second reference signal sequence of the reference signal based on the second base sequence, and mapping the second reference signal sequence to a time-frequency resource whose time domain is the symbol and whose frequency domain is the second frequency-domain resource group.

4. The method according to claim 3, wherein a cyclic shift used by the first user equipment to generate the first reference signal sequence is the same as a cyclic shift used to generate the second reference signal sequence.

5. The method according to claim 4, wherein:
the cyclic shift is received by the first user equipment from a base station; or the cyclic shift is determined by the first user equipment based on a configuration parameter, wherein the configuration parameter comprises one or more of: a user equipment-specific configuration parameter, a time domain-specific configuration parameter, a cell-specific configuration parameter, or a frequency domain-specific configuration parameter that are of the first user equipment.

6. An apparatus, comprising:
a processor and a memory, wherein the memory stores instructions which, when executed by the processor, cause the apparatus to:
determine a first base sequence corresponding to a first frequency-domain resource group and a second base sequence corresponding to a second frequency-domain resource group, wherein the first frequency-domain resource group and the second frequency-domain resource group correspond to two different frequency-domain combs on a frequency-domain resource that is on a symbol carrying a reference signal and that is used to send the reference signal, wherein the first frequency-domain resource group and the second frequency-domain resource group comprise a same quantity of subcarriers; and
generate the reference signal based on the first base sequence and the second base sequence, and map the reference signal to a time-frequency resource whose time domain is the symbol and whose frequency domain comprises the first frequency-domain resource group and the second frequency-domain resource group.

7. The apparatus according to claim 6, wherein:
the apparatus is a first user equipment, and when both the first user equipment and a second user equipment generate reference signal sequences on the first frequency-domain resource group, cyclic shifts used by the processor of the first equipment and a processor of the second user equipment to generate the reference signal sequences based on the first base sequence are different.

8. The apparatus according to claim 6, wherein the instructions, when executed by the processor, cause the apparatus to generate the reference signal based on the first base sequence and the second base sequence, and map the reference signal to a time-frequency resource by:
generating a first reference signal sequence of the reference signal based on the first base sequence, and mapping the first reference signal sequence to a time-frequency resource whose time domain is the symbol and whose frequency domain is the first frequency-domain resource group; and
generating a second reference signal sequence of the reference signal based on the second base sequence, and mapping the second reference signal sequence to a time-frequency resource whose time domain is the symbol and whose frequency domain is the second frequency-domain resource group.

9. The apparatus according to claim 8, wherein a cyclic shift used to generate the first reference signal sequence is the same as a cyclic shift used to generate the second reference signal sequence.

10. The apparatus according to claim 6, wherein:
a correspondence between the first frequency-domain resource group and the first base sequence and a correspondence between the second frequency-domain resource group and the second base sequence are pre-defined; or
a correspondence between the first frequency-domain resource group and the first base sequence and a correspondence between the second frequency-domain resource group and the second base sequence are received from a base station.

11. The apparatus according to claim 6, wherein the apparatus is a user equipment or a base station.

12. The apparatus according to claim 6, wherein the instructions, when executed by the processor, cause the apparatus to send the reference signal to a single user equipment.

13. A non-transitory computer readable medium, configured to store a computer program, where the computer program includes instructions which, when executed cause a computer to:
determine a first base sequence corresponding to a first frequency-domain resource group and a second base sequence corresponding to a second frequency-domain resource group, wherein the first frequency-domain resource group and the second frequency-domain resource group correspond to two different frequency-domain combs on a frequency-domain resource that is on a symbol carrying a reference signal and that is used to send the reference signal, wherein the first frequency-domain resource group and the second frequency-domain resource group comprise a same quantity of subcarriers; and
generate the reference signal based on the first base sequence and the second base sequence, and map the reference signal to a time-frequency resource whose time domain is the symbol and whose frequency domain comprises the first frequency-domain resource group and the second frequency-domain resource group.

14. The non-transitory computer readable medium according to claim 13, wherein the instructions, when executed cause the computer to generate the reference signal based on the first base sequence and the second base sequence, and map the reference signal to a time-frequency resource by:
generating a first reference signal sequence of the reference signal based on the first base sequence, and mapping the first reference signal sequence to a time-frequency resource whose time domain is the symbol and whose frequency domain is the first frequency-domain resource group; and
generating a second reference signal sequence of the reference signal based on the second base sequence, and mapping the second reference signal sequence to a time-frequency resource whose time domain is the symbol and whose frequency domain is the second frequency-domain resource group.

15. The non-transitory computer readable medium according to claim 14, wherein a cyclic shift used to generate the first reference signal sequence is the same as a cyclic shift used to generate the second reference signal sequence.

16. A reference signal receiving method, comprising:
receiving, by first user equipment, a reference signal, the reference signal using a time-frequency resource whose time domain is a symbol and whose frequency domain comprises a first frequency-domain resource group and a second frequency-domain resource group, wherein the first frequency-domain resource group and the second frequency-domain resource group comprise a same quantity of subcarriers;
wherein the reference signal is based on a first base sequence and a second base sequence, the first base sequence corresponding to the first frequency-domain resource group and the second base sequence corresponding to the second frequency-domain resource group, and wherein the first frequency-domain resource group and the second frequency-domain resource group correspond to two different frequency-domain combs on the time-frequency resource.

17. The method according to claim 16, wherein:

the reference signal comprises a first reference signal sequence and a second reference signal sequence, the first reference signal sequence corresponding to the first base sequence and the second reference signal sequence corresponding to the second base sequence.

18. The method according to claim 17, wherein a cyclic shift used to generate the first reference signal sequence is the same as a cyclic shift used to generate the second reference signal sequence.

19. The method according to claim 18, wherein:

the cyclic shift is received by the first user equipment from a base station; or the cyclic shift is determined by the first user equipment based on a configuration parameter, wherein the configuration parameter comprises one or more of: a user equipment-specific configuration parameter, a time domain-specific configuration parameter, a cell-specific configuration parameter, or a frequency domain-specific configuration parameter that are of the first user equipment.

20. An apparatus, comprising:

a processor and a memory, wherein the memory stores instructions which, when executed by the processor, cause the apparatus to:

receive a reference signal, the reference signal using a time-frequency resource whose time domain is a symbol and whose frequency domain comprises a first frequency-domain resource group and a second frequency-domain resource group, wherein the first frequency-domain resource group and the second frequency-domain resource group comprise a same quantity of subcarriers;

wherein the reference signal is based on a first base sequence and a second base sequence, the first base sequence corresponding to the first frequency-domain resource group and the second base sequence corresponding to the second frequency-domain resource group, and wherein the first frequency-domain resource group and the second frequency-domain resource group correspond to two different frequency-domain combs on the time-frequency resource.

21. The apparatus according to claim 20, wherein:

the reference signal comprises a first reference signal sequence and a second reference signal sequence, the first reference signal sequence corresponding to the first base sequence and the second reference signal sequence corresponding to the second base sequence.

22. The apparatus according to claim 21, wherein a cyclic shift used to generate the first reference signal sequence is the same as a cyclic shift used to generate the second reference signal sequence.

23. The apparatus according to claim 22, wherein the apparatus is first user equipment, and wherein the cyclic shift is received by the first user equipment from a base station; or the cyclic shift is determined by the first user equipment based on a configuration parameter, wherein the configuration parameter comprises one or more of: a user equipment-specific configuration parameter, a time domain-specific configuration parameter, a cell-specific configuration parameter, or a frequency domain-specific configuration parameter that are of the first user equipment.

24. The apparatus according to claim 20, wherein the apparatus is first user equipment or a base station.

* * * * *